(12) United States Patent
Kuo et al.

(10) Patent No.: US 12,304,081 B2
(45) Date of Patent: May 20, 2025

(54) DEEP COMPOSITIONAL ROBOTIC PLANNERS THAT FOLLOW NATURAL LANGUAGE COMMANDS

(71) Applicant: Massachusetts Institute of Technology, Cambridge, MA (US)

(72) Inventors: Yen-Ling Kuo, Cambridge, MA (US); Boris Katz, Cambridge, MA (US); Andrei Barbu, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 763 days.

(21) Appl. No.: 17/112,699

(22) Filed: Dec. 4, 2020

(65) Prior Publication Data
US 2021/0170594 A1    Jun. 10, 2021

Related U.S. Application Data

(60) Provisional application No. 62/944,924, filed on Dec. 6, 2019, provisional application No. 62/944,932, filed on Dec. 6, 2019.

(51) Int. Cl.
| | | |
|---|---|---|
| B25J 9/16 | (2006.01) | |
| G06N 3/042 | (2023.01) | |
| G06N 3/08 | (2023.01) | |

(52) U.S. Cl.
CPC ............ *B25J 9/1664* (2013.01); *G06N 3/042* (2023.01); *G06N 3/08* (2013.01)

(58) Field of Classification Search
CPC .......... G06N 3/042; G06N 3/08; G06N 3/044; G06N 3/008; G06N 3/045; B25J 9/1664; B25J 9/163; B25J 9/1661; G05B 2219/40393
See application file for complete search history.

(56) References Cited

U.S. PATENT DOCUMENTS

| | | | |
|---|---|---|---|
| 10,210,860 B1 * | 2/2019 | Ward | G06N 3/044 |
| 10,380,236 B1 * | 8/2019 | Ganu | G06F 40/169 |
| 11,170,293 B2 * | 11/2021 | Gao | G06N 3/08 |
| 2008/0091628 A1 * | 4/2008 | Srinivasa | G06N 3/08 706/12 |
| 2018/0307779 A1 * | 10/2018 | Tellex | G06N 3/045 |
| 2021/0005182 A1 * | 1/2021 | Han | G10L 15/16 |

OTHER PUBLICATIONS

Y.-L. Kuo, A. Barbu and B. Katz, "Deep Sequential Models for Sampling-Based Planning," 2018 IEEE/RSJ International Conference on Intelligent Robots and Systems (IROS), Madrid, Spain, 2018, pp. 6490-6497, doi: 10.1109/IROS.2018.8593947. (Year: 2018).*

(Continued)

*Primary Examiner* — Shahid K Khan
(74) *Attorney, Agent, or Firm* — Hamilton, Brook, Smith & Reynolds, P.C.

(57) ABSTRACT

The present approach similarly combines task and motion planning, but does so without symbolic representations and begins with simpler tasks than other models in such domains can handle. Unlike prior approaches, the present approach does so in continuous action and state spaces which require many precise steps in the configuration space to execute what otherwise is a single output token such as "pick up" for discrete problems.

13 Claims, 15 Drawing Sheets

(56) References Cited

OTHER PUBLICATIONS

Zang, Xiaoxue, et al. "Translating navigation instructions in natural language to a high-level plan for behavioral robot navigation." arXiv preprint arXiv:1810.00663 (2018). (Year: 2018).*
Kuo, Yen-Ling, Andrei Barbu, and Boris Katz. "Deep sequential models for sampling-based planning" 2018 IEEE/RSJ International Conference on Intelligent Robots and Systems (IROS) (Year: 2018).*
Mei, Hongyuan, Mohit Bansal, and Matthew Walter. "Listen, attend, and walk: Neural mapping of navigational instructions to action sequences." Proceedings of the AAAI Conference on Artificial Intelligence. vol. 30. No. 1. 2016 (Year: 2016).*
Paxton, Chris, et al. "Prospection: Interpretable plans from language by predicting the future." 2019 International Conference on Robotics and Automation (ICRA). IEEE, 2019 (Year: 2019).*
Karaman, Sertac, and Emilio Frazzoli. "Sampling-based algorithms for optimal motion planning." The international journal of robotics research 30.7 (2011): 846-894.
Elbanhawi, Mohamed, and Milan Simic. "Sampling-based robot motion planning: A review." Ieee access 2 (2014): 56-77.
Gammell, Jonathan D., et al. "Batch informed trees (BIT*): Sampling-based optimal planning via the heuristically guided search of implicit random geometric graphs." 2015 IEEE international conference on robotics and automation ICRA). IEEE, 2015.
Burget, Felix, et al. "BI 2 RRT*: An efficient sampling-based path planning framework for task-constrained mobile manipulation." 2016 IEEE/RSJ International Conference on Intelligent Robots and Systems (IROS). IEEE, 2016.
Adiyatov, Olzhas, and Huseyin Atakan Varol. "A novel RRT*—based algorithm for motion planning in Dynamic environments." 2017 IEEE International Conference on Mechatronics and Automation (ICMA). IEEE, 2017.
Urmson, Chris, and Reid Simmons. "Approaches for heuristically biasing RRT growth." Proceedings 2003 IEEE/RSJ International Conference on Intelligent Robots and Systems (IROS 2003)(Cat. No. 03CH37453). vol. 2. IEEE, 2003.
Lindemann, Stephen R., and Steven M. LaValle. "Incrementally reducing dispersion by increasing Voronoi bias in RRTs." IEEE International Conference on Robotics and Automation, 2004. Proceedings. ICRA'04. 2004. vol. 4. IEEE, 2004.
L. E. Baum and T. Petrie, "Statistical inference for probabilistic functions of finite state markov chains," The annals of mathematical statistics, vol. 37, No. 6, pp. 1554-1563, 1966.
Hochreiter, Sepp, and Jürgen Schmidhuber. "Long short-term memory." Neural computation 9.8 (1997): 1735-1780.
Siddharth, Narayanaswamy, et al. "Seeing what you're told: Sentence-guided activity recognition in video." Proceedings of the IEEE Conference on Computer Vision and Pattern Recognition. 2014.
Yu, Haonan, et al. "A compositional framework for grounding language inference, generation, and acquisition in video." Journal of Artificial Intelligence Research 52 (2015): 601-713.
Donahue, Jeffrey, et al. "Long-term recurrent convolutional networks for visual recognition and description." Proceedings of the IEEE conference on computer vision and pattern recognition. 2015.
Fulgenzi, Chiara, et al. "Probabilistic navigation in dynamic environment using rapidly-exploring random trees and gaussian processes." 2008 IEEE/RSJ International Conference on Intelligent Robots and Systems. IEEE, 2008.
Barbu, Andrei, et al. "Simultaneous object detection, tracking, and event recognition." arXiv preprint arXiv:1204.2741 (2012).

Ramanathan, Vignesh, et al. "Detecting events and key actors in multi-person videos." Proceedings of the IEEE conference on computer vision and pattern recognition. 2016.
Aoude, Georges S., et al. "Probabilistically safe motion planning to avoid dynamic obstacles with uncertain motion patterns." Autonomous Robots 35.1 (2013): 51-76.
Le, Tuan Anh, et al. "Inference compilation and universal probabilistic programming." Artificial Intelligence and Statistics. PMLR, 2017.
Kulkarni, Tejas D., et al. "Picture: A probabilistic programming language for scene perception." Proceedings of the ieee conference on computer vision and pattern recognition. 2015.
Narayanaswamy, Siddharth, et al. "Seeing unseeability to see the unseeable." arXiv preprint arXiv:1204.2801 (2012).
Bowen, Chris, and Ron Alterovitz. "Closed-loop global motion planning for reactive execution of learned tasks." 2014 IEEE/RSJ International Conference on Intelligent Robots and Systems. IEEE, 2014.
Bowen, Chris, and Ron Alterovitz. "Asymptotically optimal motion planning for tasks using learned virtual landmarks." IEEE Robotics and Automation Letters 1.2 (2016): 1036-1043.
Kim, Beomjoon, et al. "Guiding search in continuous state-action spaces by learning an action sampler from off-target search experience." Proceedings of the AAAI Conference on Artificial Intelligence. Vol. 32. No. 1. 2018.
I. Goodfellow, J. Pouget-Abadie, M. Mirza, B. Xu, D. Warde-Farley, S. Ozair, A. Courville, and Y. Bengio, "Generative adversarial nets," in NIPS, 2014.
Janson, Lucas, et al. "Monte Carlo motion planning for robot trajectory optimization under uncertainty." Robotics Research. Springer, Cham, 2018. 343-361.
Arslan, Omur, et al. "Sensory steering for sampling-based motion planning." 2017 IEEE/RSJ International Conference on Intelligent Robots and Systems (IROS). IEEE, 2017.
Schmitt, Philipp S., et al. "Optimal, sampling-based manipulation planning." 2017 IEEE International Conference on Robotics and Automation (ICRA). IEEE, 2017.
Čáp, Michal, et al. "Multi-agent RRT*: Sampling-based cooperative pathfinding." arXiv preprint arXiv:1302.2828 (2013).
Chen, Yufan, et al.. "Decoupled multiagent path planning via incremental sequential convex programming." 2015 IEEE International Conference on Robotics and Automation (ICRA). IEEE, 2015.
Kiesel, Scott, et al. "An effort bias for sampling-based motion planning." 2017 IEEE/RSJ International Conference on Intelligent Robots and Systems (IROS). IEEE, 2017.
Hopfield, John J. "Neural networks and physical systems with emergent collective computational abilities." Proceedings of the national academy of sciences 79.8 (1982): 2554-2558.
Cho, Kyunghyun, et al. "On the properties of neural machine translation: Encoder-decoder approaches." arXiv preprint arXiv:1409. 1259 (2014).
Palangi, Hamid, et al. "Deep sentence embedding using long short-term memory networks: Analysis and application to Information retrieval." IEEE/ACM Transactions on Audio, Speech, and Language Processing 24.4 (2016): 694-707.
Sucan, Ioan A., Mark Moll, and Lydia E. Kavraki. "The open motion planning library." IEEE Robotics & Automation Magazine 19.4 (2012): 72-82.
Hsu, David, et al. "Path planning in expansive configuration spaces." Proceedings of International Conference on Robotics and Automation. Vol. 3. IEEE, 1997.

* cited by examiner

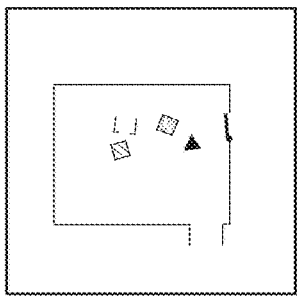
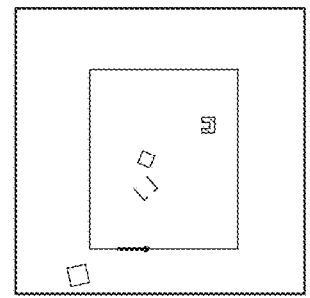
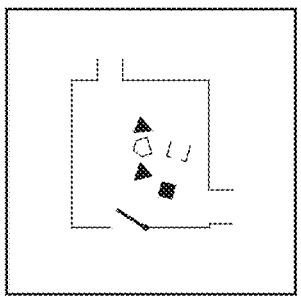
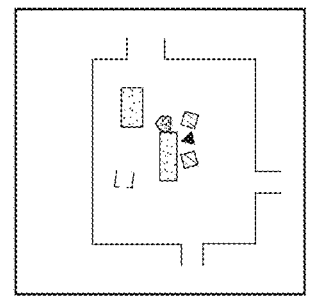
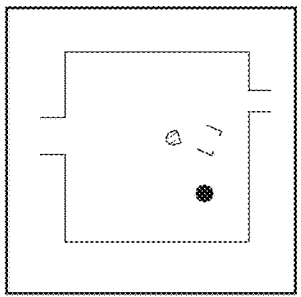
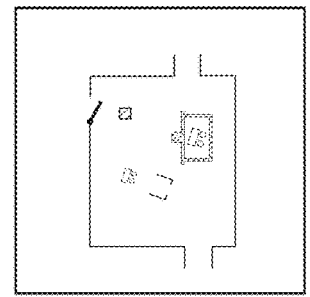
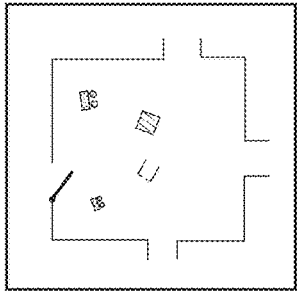
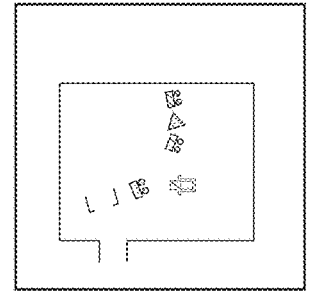
Representative examples of the training set
FIG. 3A
Representative examples of the test set
FIG. 3B

| Planner | Two Concepts | Five or Six Concepts |
|---|---|---|
| RNN-Only | 0.25 | 0.24 |
| BoW | 0.61 | 0.36 |
| Applicant's Planner | 0.72 | 0.50 |
| RTT+Oracle | 0.64 | 0.49 |

FIG. 4

| Planner | Obstacles | Cup & Lid | Door |
|---|---|---|---|
| RNN-Only | 0.12 | 0.08 | 0 |
| BoW | 0.32 | 0.08 | 0.35 |
| Ours | 0.52 | 0.16 | 0.30 |
| RTT+Oracle | 0.52 | 0.08 | 0.35 |

FIG. 5

| Planner | Number of sentences | | |
|---|---|---|---|
| | 1 | 2 | 3 |
| RNN-Only | 0.17 | 0 | 0 |
| BoW | 0.40 | 0.12 | 0.06 |
| Ours | 0.58 | 0.33 | 0.10 |
| RTT+Oracle | 0.52 | 0.25 | 0.12 |

FIG. 6

DEEP COMPOSITIONAL ROBOTIC PLANNERS THAT FOLLOW NATURAL LANGUAGE COMMANDS

RELATED APPLICATIONS

This application claims the benefit of U.S. Provisional Application No. 62/944,924, filed on Dec. 6, 2019 and U.S. Provisional Application No. 62/944,932, filed on Dec. 6, 2019. The entire teachings of the above applications are incorporated herein by reference.

GOVERNMENT SUPPORT

This invention was made with Government support under Grant No. CCF1231216 awarded by the National Science Foundation (NSF). The Government has certain rights in the invention.

BACKGROUND

Prior work has explored how symbolic representations in high-level planning languages, such as Planning Domain Definition Language (PDDL), can ground linguistic commands. Some approaches combine task planning and motion planning using symbolic representations for the task. Such approaches can plan in large continuous spaces but require a symbolic representation of a task, must be manually created, cannot be trained to acquire new concepts, and do not handle ambiguity well.

SUMMARY

The present approach similarly combines task and motion planning, but does so without symbolic representations and begins with simpler tasks than other models in such domains can handle. Unlike prior approaches, the present approach does so in continuous action and state spaces which require many precise steps in the configuration space to execute what otherwise is a single output token such as "pick up" for discrete problems.

A configuration space is all possible configurations of an environment. For example, the configuration space of an environment with a robot can include dimension for coordinates of center of mass for the robot, and location and orientation of all joints, status of lights, and other variables, binary, discrete, or continuous. In an embodiment, the configuration space can also be the configuration of all the objects in the environment and all of their possible states (e.g., locations, orientations, etc.). The configuration space can also represent virtual space, such as a dimension of audio of two agents talking to each other. In other embodiments, the configuration can represent a virtual database or other information repository, such that an agent can modify a row in the database. In such an embodiment, then the purpose of the agent is to change the configuration of the database in response to an NL command, such as "transfer all the money in all of these accounts to this account." A coordinate of the configuration is a particular possible state within the configuration space (e.g., one permutation of the statuses of the agent/robot, all other items, and states).

Current models can robustly follow linguistic commands on top of these architectures. Some current work cannot acquire concepts that are not easily expressed in the target planning language and cannot learn new primitives in that language because of the underlying symbolic nature of the final representation. For example, some current models break down tasks for such planners automatically and learn to map sentences to a sequence of subgoals. Other work demonstrates how to break down manipulation tasks and how to ground them to perception from natural language input, but does not execute such commands. Some other works demonstrate mapping sentences to robotic actions (i.e., navigation, and pick and place) via multi-task reinforcement learning in a discrete state and action space. Further work demonstrates how a drone can be controlled by predicting the goal configuration of the robot. These prior models operate in a continuous space, but do not contain object interactions, manipulations, or obstacles. Predicting a single final goal for such complex multistep actions is infeasible, as the goal must contain not just the position of the robot but the position of the other objects.

In an embodiment, a method includes determining, by a planner, a first point in a selected neighborhood of a configuration space. The method further includes determining, by a neural network, a second point in the selected neighborhood of the configuration space. The method further includes choosing among the first point and second point to generate an additional node to add to a search tree. The method further includes adding the additional node to the search tree by connecting the additional node to a node associated with the selected neighborhood. The method, using a planner in conjunction with a neural network (NN) structured according to a human or computer language input, controls behavior of an agent corresponding to the search tree having the additional node. In an embodiment, the neural network is a recurrent neural network (RNN).

A person having ordinary skill in the art can recognize that determining the first point can be performed before, after, or simultaneously with determining the second point.

In an embodiment, the method further includes determining the selected neighborhood by (a) determining a first neighborhood to add a node to a search tree by evaluating one or more selected nodes of the search tree with a planner, each node representing a coordinate in the configuration space and determining a second neighborhood to add a node to the search tree by evaluating the one or more selected nodes of the search tree with a neural network. The method then chooses a selected neighborhood among the first neighborhood and second neighborhood based on at least one of a respective level of confidence determined for the first neighborhood and second neighborhood, at least one extrinsic factor, and an impossibility factor.

In embodiments, the hypotheses include at least one of confidence weights and features.

In embodiments, evaluating the one or more nodes of the search tree with the planner or the neural network is based on observations.

In embodiments, the NN includes component NNs.

In embodiments, the NN outputs to the agent at least one of a path, destination, and stopping point.

In an embodiment, a system includes a processor and a memory with computer code instructions stored thereon. The processor and the memory, with the computer code instructions, being configured to cause the processor to determine, by a planner, a first point in a selected neighborhood of a configuration space and determine, by a neural network, a second point in the selected neighborhood of the configuration space. The processor and the memory are further configured to choose among the first point and second point to generate an additional node to add to a search tree. The processor and the memory are further configured to add the additional node to the search tree by connecting the additional node to a node associated with the selected neighborhood. A neural network (NN) structured according to a human or computer language input controls behavior of an agent corresponding to the search tree having the additional node.

A person having ordinary skill in the art can recognize that determining the first point can be performed before, after, or simultaneously with determining the second point.

In an embodiment, the instructions further configure the processor to determine the selected neighborhood by (a) determining a first neighborhood to add a node to a search tree by evaluating one or more selected nodes of the search tree with a planner, each node representing a coordinate in the configuration space and (b) determining a second neighborhood to add a node to the search tree by evaluating the one or more selected nodes of the search tree with a neural network. The processor and the memory are further configured to choose a selected neighborhood among the first neighborhood and second neighborhood based on at least one of a respective level of confidence determined for the first neighborhood and second neighborhood, at least one extrinsic factor, and an impossibility factor.

In an embodiment, the hypotheses include at least one of confidence weights and features.

In an embodiment, a system includes a processor and a memory with computer code instructions stored thereon. The processor and the memory, with the computer code instructions, are configured to cause the system to evaluate one or more nodes of a search tree with a planner, evaluate one or more nodes of the search tree with a neural network, based on said evaluations, choose one of the evaluated nodes, produce respective hypotheses of the one or more nodes from the planner and neural network, and as a function of the evaluated nodes, add one additional node to the search tree. A neural network (NN) structured according to a human or computer language input controls behavior of an agent corresponding to the search tree.

In an embodiment, a method includes determining, by a planner, a first neighborhood of a configuration space and a first point in the first neighborhood. The method further includes determining, by a neural network, a second neighborhood of a configuration space and a second point in the second neighborhood. The method further includes choosing among the first point and second point to generate an additional node to add to a search tree. The method further includes adding the additional node to the search tree by connecting the additional node to a node associated with the selected neighborhood. A neural network (NN) structured according to a human or computer language input controls behavior of an agent corresponding to the search tree having the additional node.

A person having ordinary skill in the art can recognize that determining the first neighborhood and first point can be performed before, after, or simultaneously with determining the second neighborhood and second point.

In an embodiment, a method includes producing a neural network (NN) having a directed graph internal structure. The method further includes filtering communication within the NN, from a first set of mutually exclusive nodes to a second set of mutually exclusive nodes, using an attention map, wherein filtering the communication from the first set to the second set facilitates communication via any edges connecting the first set to the second set with the attention map.

In an embodiment, the attention map employs scalar values (e.g., from 0 to 1). In an embodiment, wherein the attention map is grayscale.

In an embodiment, applying the attention map to the data includes multiplying the scalar values of the attention map to the values of the sensed data.

In an embodiment, the directed graph internal to the NN encodes sentences.

In an embodiment, pieces of the graph correspond to words.

In an embodiment, the attention map modulates an input.

In an embodiment, the NN executes a program.

In an embodiment, a system includes a processor and a memory with computer code instructions stored thereon. The processor and the memory, with the computer code instructions, are configured to cause the system to produce a neural network (NN) having a directed graph internal structure. The processor and memory are further configured to filter communication within the NN, from a first set of mutually exclusive nodes to a second set of mutually exclusive nodes, using an attention map, wherein filtering the communication from the first set to the second set facilitates communication via any edges connecting the first set to the second set with the attention map.

In an embodiment, the attention map includes scalar values (e.g., from 0 to 1). In an embodiment, the attention map is grayscale.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 3A is a diagram illustrating example embodiments of the training set.

FIG. 3B is a diagram illustrating example embodiments of the test set.

FIG. 4 is a table illustrating a success rate of executing natural language commands with two concepts (e.g., the number of models used during training), and five or six concepts (e.g., more complex sentences than used during training).

FIG. 5 is a table illustrating a success rate of different baselines and models when generalizing to environments that have properties that are not expected at training time.

FIG. 6 is a table illustrating a success rate of each model per number of sentences.

DETAILED DESCRIPTION

Figure 1:
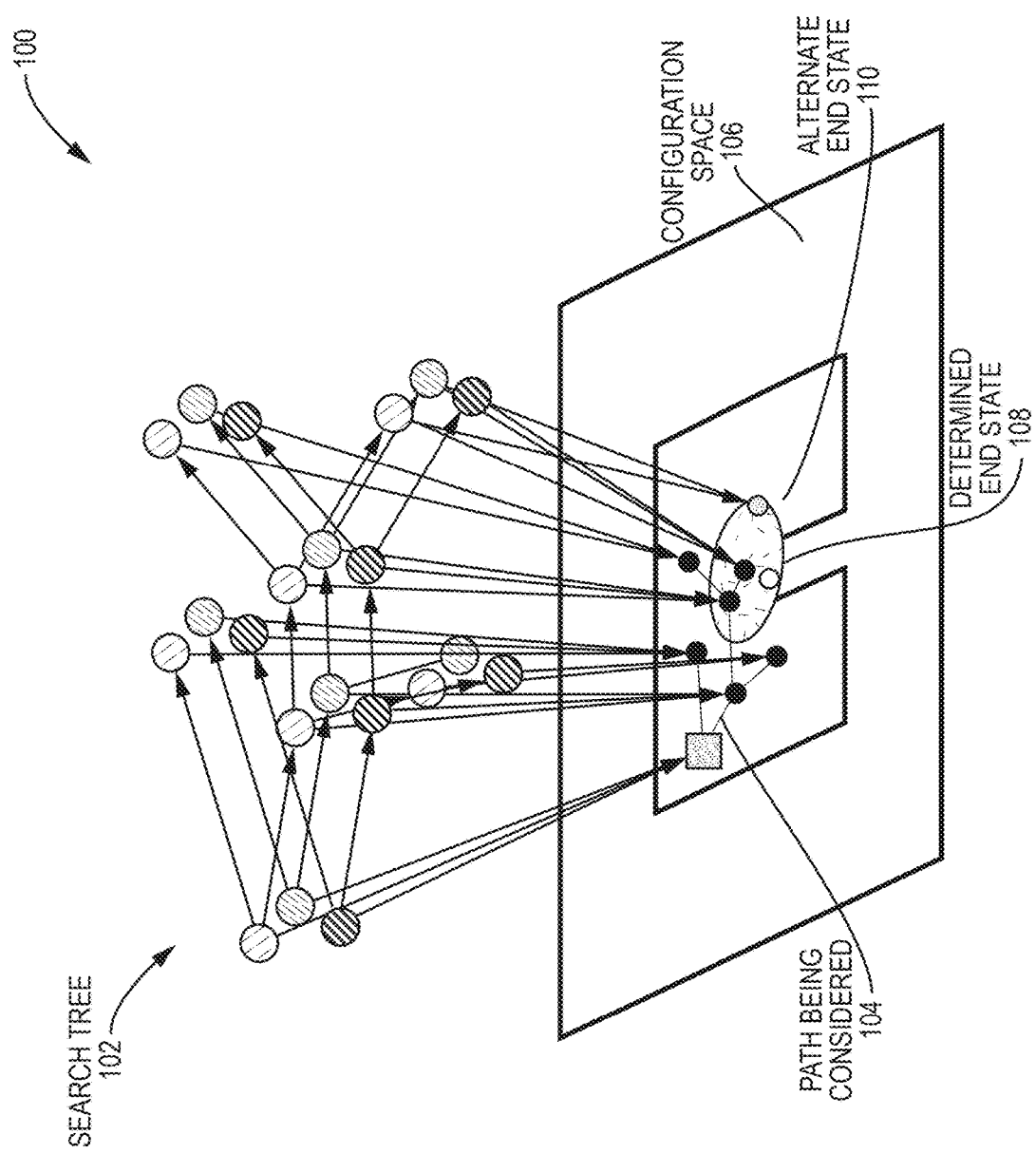
FIG. 1. is a diagram illustrating an embodiment of the present disclosure configured to augment a sampling-based planner, RRT, with a hierarchical network that encodes the meaning of a natural-language command for the robot to follow.

A description of example embodiments follows.

An augmented sampling-based robotic planner can be trained to understand a sequence of natural language commands, in a continuous configuration space, to move and manipulate objects. The present approach combines a deep network structured according to a parse of a complex command that includes objects, verbs, spatial relations, and attributes, with a sampling-based planner, RRT. A hierarchical deep network controls how the planner explores the environment, determines when a planned path is likely to achieve a goal, and estimates the confidence of each move to trade off exploitation and exploration between the network and the planner. A path is a collection of one or more directions or vectors movement for the agent/robot. Planners are designed to have near-optimal behavior when information about the task is missing, while networks learn to exploit observations that are available from the environment, making the two naturally complementary. Combining the two enables generalization to new maps, new kinds of obstacles, and more complex sentences that do not occur in the training set. Little data is required to train the model despite it jointly acquiring a CNN that extracts features from the environment as it learns the meanings of words. The model provides a level of interpretability using attention maps that allow users to see its reasoning steps, despite being an end-to-end model. The end-to-end model allows robots to learn to follow natural language commands in challenging continuous environments.

For a human, carrying out a command uttered in natural language is based on two factors: (1) knowledge about the task to be performed, (2) how the task was carried out in the past, and (3) reasoning about the consequences of the actions. Thinking about the task allows the person to choose actions that are likely to make progress, and it is most useful when the path forward is clearly understood in an environment that has been previously experienced. Thinking about the consequences of the actions allows the person to handle new environments and obstacles, and it is most useful where a task should be performed in a novel way.

Generally, current work in robotics cannot do both of these factors simultaneously. While some powerful models can control agents, they do so from moment to moment without planning complex actions. At the same time, planners can efficiently explore configuration spaces, often by building search trees, but need a target final configuration or a symbolic specification of constraints.

The present disclosure demonstrates an end-to-end model that both (1) reasons about a task and (2) plans its action in a continuous domain, resulting in a robot that can follow linguistic commands. This is the first model to perform end-to-end navigation and manipulation tasks given natural language commands in continuous environments without symbolic representations. The present disclosure integrates a planner with a compositional hierarchical network. The network learns which actions are useful toward a goal specified in natural language, while the planner provides resilience when the situation becomes unclear, novel, or too complicated. This process frees the network from having to learn the minutia of planning and allows it to focus on the overall goal, while gaining robustness to novel environments.

In general, Applicant discloses a robot that plans a task from start to goal based on a natural language command. Such a plan can be in the form of a list of features of the robot in six-dimensions (6D) for every joint of the robot. The features can include the position and orientation of each joint for every time step. With unlimited computing power, a brute force method can calculate the plan, but more efficient methods are desired. In the present disclosure, Applicant's system trains a neural network based on previous traces or moves, which can be from demonstration or random sampled ones, and figures out how to manipulate the robot from the start state to the goal state.

In a first embodiment, a collection of neural networks learns how to understand natural language commands. Consider a training example of telling a robot to walk to a desk. The robot can walk around until it learns the desk is a good result, as one example (e.g., from the desk being identified as the goal state).

In this embodiment, nodes of a search tree with a planner and a search tree with a neural network are evaluated. Based on the respective evaluations, one of the nodes is chosen, and for each of those nodes, hypotheses are produced for the planner and neural network. Then, as a function of those evaluated nodes, one of the nodes is added to the tree. This leverages the planning ability of the planner and the learning ability of a neural network, without relying heavily on either.

In addition, a collection of neural networks is configured, where the neural network is composed of component neural networks, each based on a command or a word of a command. However, no meaning is specified of the words in each neural network. The robot is told the start and end point, path, and it learns words via the training without any given definition for said words.

In this embodiment, a method produces a neural network (NN) having a directed graph internal structure having a first and second set of mutually exclusive nodes. Then, the method enables communication within the NN, from the first set of the mutually exclusive nodes to the second set of mutually exclusive nodes, using an attention map.

In another embodiment, applicant's system can employ attention maps, which are n-dimensional vectors. Internal reasoning maps can be converted into said attention maps. The attention map can have vector with values between zero and one, which are multiplied by the perception of the robot. In other words, the information in this channel is filtered to be in grayscale. The image the robot sees can be multiplied by this grayscale map, which restricts the robot's attention to certain areas of the actual image. The robot only reasons with the information from these attention maps. The attention maps therefore reweight and apply new weights to the robot information.

Counterintuitively, using a grayscale attention map to reduce the amount of information perceived by the robot improves the robot's performance. The reduction of information via the multiplication with the grayscale mapping calibrates the information perceived by the robot, so more relevant information can be highlighted.

The attention maps are a class of interpretable data structures. The attention maps are vectors and human interpretable.

Meanwhile, every word is represented by two neural networks. A first neural network represents a future state of the word, and a second neural network represents the attention it should give to the next word.

Figure 2:
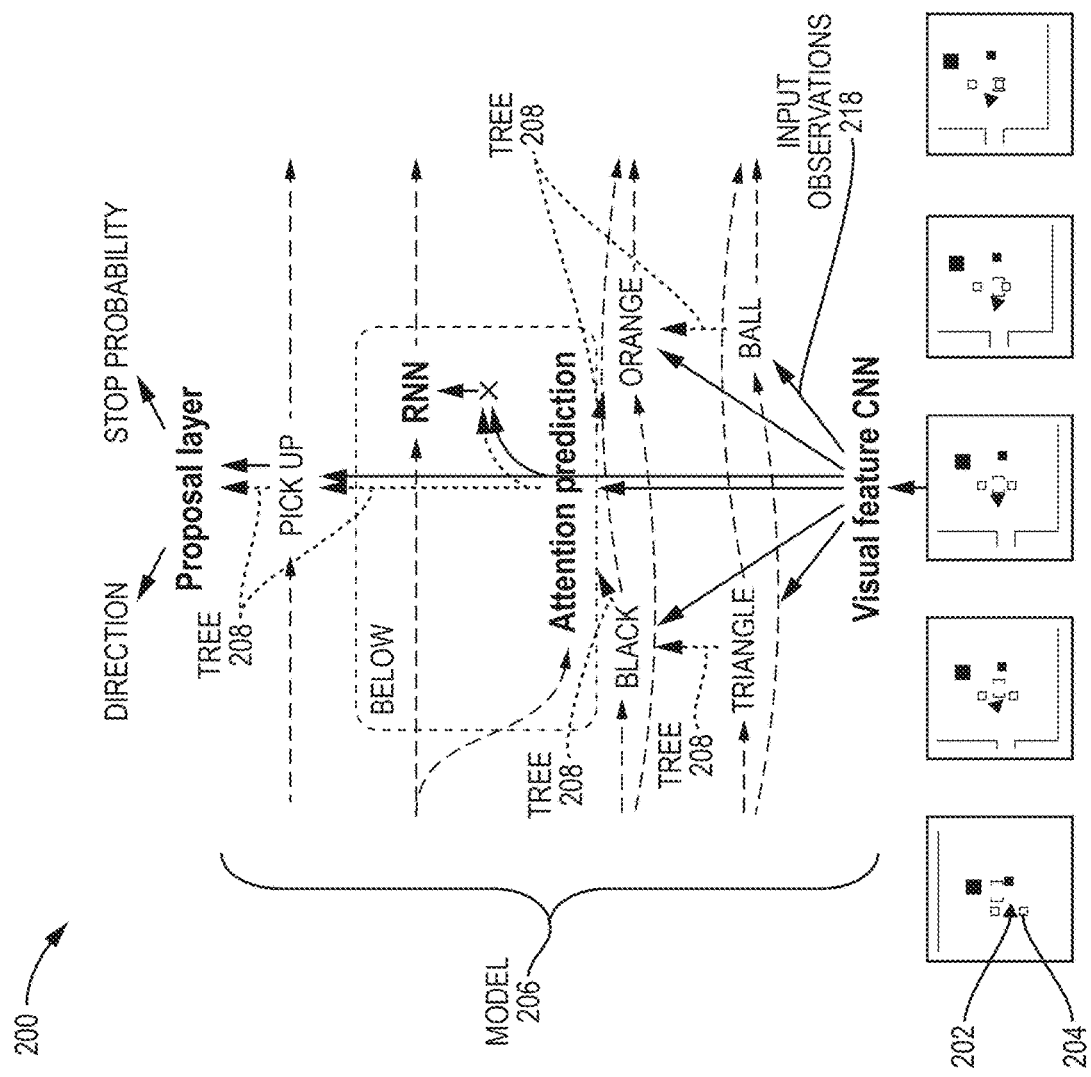
FIG. 2 is a diagram illustrating an example embodiment of structure of the model interpreting and following a particular command.

FIG. 1. is a diagram 100 illustrating an embodiment of the present disclosure configured to augment a sampling-based planner, RRT, with a hierarchical network that encodes the meaning of a natural-language command for the robot to follow. Just like traditional planner, the robot explores the space around a start location to build a search tree 102 configured to find a good path 104 in its configuration space 106. Unlike a traditional planner, the present planner does not specify a goal as a location in the configuration space 106, but instead relies on a neural network to score a probability that any position in the configuration space is to be an end state by considering the past history of the robot's actions and its observation of the environment. The structure of the NNs mirrors that of the search tree, with each splitting off as different decisions are considered. At each time step, the NNs observe the environment, and can adjust the sampling process of the planner to avoid moving in undesirable locations within the configuration space 106. In this case, the tree is not expanded toward the alternate end state 110, and instead adjusted to go down the passageway through the determined end state 108. FIG. 2, described in further detail below, illustrates structured NNs encoding the structure of sentences as relationships between models.

To execute a command, the model proceeds as a traditional sampling-based planner with an additional input of a natural language command. A collection of networks, arranged in a hierarchy, mirror the parse of the command. This encodes command into the structure of the model. A search tree is created through a modified RRT planner that explores different configurations of the robot and their effect on the environment. The search procedure is augmented by the hierarchical network, which can influence the nodes being expanded and the direction of expansion. As the search tree splits into multiple branches, the hierarchical network similarly splits following the tree. This encodes the reasoning and state of the robot if it were to follow that specific set of actions. At each time point, the network predicts the likelihood that the action satisfies the command. In the end, much as with a classical sampling-based planner, a search tree is created that explores different options, and a path in that tree is selected to be executed.

Robustness to new environments is achieved by using the planner with the hierarchical network, where the hierarchical network is weighted proportionally to its confidence. When new obstacles, or map features, or other difficulties are encountered (e.g., not immediately seeing a goal), the method can temporarily devolve into a traditional RRT planner. This is a desirable feature because methods like those used by RRT planners make optimal decisions when other guidance is not available. Unlike planners, uncertain or untrained networks generally make pathologically bad decisions in such settings. This issue is often alleviated with techniques such as ε—greedy learning, which provides arbitrary random moves rather than the near optimal exploration that sampling-based planners engage in.

FIG. 2 is a diagram 200 illustrating an example embodiment of structure of the model 206 interpreting and following the command "pick up the orange ball 202 from below black triangle 204." Input observations 218 are illustrated by the blue arrows. As the search tree illustrated by FIG. 1 is constructed, the model 206 illustrated by FIG. 2 interprets the state of each tree node of the tree 208 being expanded. The model 206 encodes the meaning of the sentence. The red lines form the path of the model 206 to the top. The orange lines represent the hidden states of each word passing between time steps and are a state keeping method that represent which actions have been performed. The layers of the neural network are organized in a model 206 instead of in sequence. The model predicts the direction to expand the node in and whether the node completes the plan being followed. Each word (e.g., pick, up, the, orange, ball, from, below, black, and triangle) is a module in the neural network, and each module contains two neural networks. The associated hidden state of each word is updated at each time step using an NN. The structure of the network is derived automatically from a parse produced by the NLTK coreNLP parser. Visual features of the environment are extracted and provided to each word model. For each word, Applicant's system predicts attention maps by a combination of the visual features, the attention maps of any words directly below in the hierarchy, and the state of that word. The attention maps indicate which objects should be manipulated and how they should be manipulated. The attention map of the final word and the output of its NN are used to predict the direction of movement and the success probability. Using attention maps as the mechanism to forward information in the network provides a level of interpretability.

The model of FIG. 2 provides a level of interpretability in two ways. First, the structure of the sentence is encoded explicitly into the structure of the network by the model 206 of the model. Inspecting the network reveals which subnetworks are connected. The topology of the connections mirrors that of natural language. Second, the internal reasoning of the model is highly constrained to operate through the attention maps 208a-e. Rather than allowing each component the freedom to pass along any information up the hierarchy to make a decision, the method constrains all components to communicating via a grayscale attention map that is multiplied by the current observation of the environment. A grayscale attention map can be understood by a person having ordinary skill in the art as a matrix of scalar values from 0 to 1, although other values and proportions can be used. The values within the attention map indicate whether attention should be given to a particular area represented by the matrix (e.g., values closer to 1 indicating giving attention and values closer to 0 indicating not giving attention). Inspecting these attention maps reveals information about which areas each network is focused on and can provide a means to understand and explain failures. In addition, this constrained representation is easy for the model to learn and does not require many examples of model training compared to other existing solutions. Adding these interpretable computations also increases performance relative to more opaque representations. Using these maps increases performance because words that have never co-occurred at training time have an easier time understanding the output of other word models when the representations are interpretable.

This disclosure makes four contributions:

1) A robotic planner can be extended to reason about (a) a linguistic command in a continuous environment and (b) physical affordances and obstacles.

2) A hierarchical model structured according to the parse of a sentence can learn meanings of sentences efficiently, thereby guiding a robot's motion and manipulation.

3) The hierarchical model generalizes (a) to new settings, (b) to more challenging maps that include obstacles not seen in the training set, and (c) to longer commands.

4) Production of an end-to-end model with more interpretable intermediate reasoning steps without use of intermediate symbolic representations. The end-to-end model is produced by constraining the end-to-end model to reason visually through attention maps rather than arbitrary vectors.

Deep planners with language include three elements. First, neural networks extend RRT to control the search process. Second, the deep planner has a model with a certain structure, and can encode complex sentences in the structure of the model. Third, efficient training is applied to such networks.

A. Planning with Deep RRT

Robotic planners are efficient at searching the configuration spaces of robots. The present disclosure augments robot planners with neural networks that efficiently learn language, guide the planning process, and recognize when a plan described by a sentence has been completed. Other approaches introduce deep sequential models for sampling-based planning, and guided behavior of a RRT-based planner with a neural network.

Applicant's planner maintains a search tree and a corresponding neural network with the goal of reaching a fixed destination or multiple destinations in the configuration space. In relation to the model illustrated by FIG. 1, the present disclosure provides a collection of networks that determines a final configuration based on the command rather than explicitly providing it. A person having ordinary skill in the art can recognize that the model is a combination of the network, the tree, and the agent. With a traditional planner, the goal is constructing a search tree that explores the space and connecting a start state of the environment to an end state of the environment. The traditional planner then chooses the best path between the start state to the end state within the tree for the robot to follow.

In applicant's method, at each step, the planner chooses a node to extend by the RRT mechanism by sampling a point in space and finding the nearest point in the tree to that sample. The planner then proposes a new tree node between the selected tree node and the sampled point. The neural network receives, as input, the state at the current node, any visual observations at the current node, and the proposed extension to the tree. The visual observations are processed with a co-trained CNN that is shared among all words. The network makes its own prediction about how to extend the tree at the current node along with a confidence value. A simple mixture model selects a direction between the planner chosen direction and the network proposed direction. Once the tree is constructed, after a fixed number of planning steps or a planning phase, the planner chooses the node considered most likely to be an end state of the described command, and the planner generates the path between the start state and that node.

The method choses which node to expand and the direction to expand the node. In contrast, current methods expand a preselected node and only choose the direction to expand, but do not choose or select the node to expand. The neural network that guides the planner is trained to maximize the likelihood of the data provided. This results in a probability assigned to each node and each path. Every search tree node is annotated with its probability conditioned on its parent and the probability of being chosen for expansion by the RRT. The planner computes the latter probability (e.g., the probability of being chosen for expansion) by generating many free-space samples and computing the distribution over which nodes are extended, which is computationally efficient. The method then, to sample which node to extend, multiplies and normalizes these probabilities by sampling from the distribution of nodes chosen by both the network and RRT. This focuses searching in areas where plans are likely to succeed, while not allowing the neural network to get stuck in one region. As a region is more saturated with samples, the likelihood that RRT continues to extend the tree in decreases.

B. Language and Deep RRT

The model described above uses a single network to guide the planner. Technically, this is serviceable because the network can in principle learn to perform this task. Practically, generalizing to new sentences and complex sentential structures is beyond the abilities of that simple model.

To improve on the single network embodiment described above, a collection of networks can generalize to new sentences. In such an embodiment, each network can make a prediction. A direction is sampled from the posterior distribution over all the predictions by all of the networks.

This collection of networks is built out of a lexicon of component networks. Given a training set of commands and paths, for each word in the command that the robot is following, the method trains one component network. Given a test sentence, the words in the sentence determine the set of component networks that guide the planner. This is called the bag of words (BoW) model because there is no explicit relationship or information flow between the networks. Due to the lack of relationships between words, the BoW model has fundamental difficulties representing the difference between "Grab the black toy from the box" and "Grab the toy from the black box."

To address this characteristic of BoW models, the method employs a hierarchical network, illustrated in FIG. 2. Given a sentence and the parse of the sentence derived from the Natural Language Toolkit (NLTK) coreNLP parser, the method selects the same set of component networks that correspond to the words in the sentence. The method arranges the networks in a tree, where, in most linguistic representations, each tree is rooted by a verb. The state at the current node informs the representation of each component network. Each component updates its own hidden state and forwards information to all components that are linked to it. The leaves of the tree only receive an observation at the current state and their own hidden state as input. The root of the tree produces an output used by a linear proposal layer to predict the direction of movement and the likelihood that the current node has reached a goal. This approach can represent the earlier distinction about which noun the adjective 'black' modifies (e.g., attaches to) because different modifications/attachments result in different parse trees and thus different instantiations of the model. The approach is sensitive to argument structure because verbs that take multiple arguments such as 'give' must always take them in the same order (e.g., the object of the 'give' and the destination of the 'give' should always fill the slots of 'give').

The method restricts nodes to communicating via attention maps rather than arbitrary vectors. This helps generalization because words that do not co-occur in the training set can be seen in the test set of the reported experiments. By ensuring that the representation (e.g., the attention maps) shared between component networks is universal, component networks are encouraged to be more inter-compatible. The compatibility is enforced by the structure of each component network. In other words, each network corresponds to a word. Each word receives, as input, a set of attention maps, weighs the input image with each attention map independently, and combines this with the hidden state of that word. Then, the method predicts a new attention map, which is passed to subsequent words. Using this predicted attention map, an NN receives the observed image weighted by the attention map and updates the hidden state of the word. In addition to encouraging generalization, attention maps can be interpreted by humans, and help speed up learning by being relatively low dimensional.

C. Training Compositional Deep RRT

Three parts of the model are trained: (1) the shared CNN that embeds visual observations, (2) a lexicon of component networks, and (3) the proposal layer. The lexicon of component networks maps words to networks that represent the meanings of those words. In one embodiment, when a word is relevant to a plan it can be annotated, and then each word can be trained independently. However, in another embodiment, joint training allows easier and already-known words to supervise new words because the hierarchical nature of the model allows information flow between words, giving words with high confidence an opportunity to guide the representation of words that are not yet well-trained. This embodiment can lead to improved results. The model can be trained with little supervision using pairs of sentences and paths. The model is not informed about which parts of the sentence correspond to which parts of the path, when words are relevant, or how words relate to visual observations.

The overall model is trained in two phases. First, all weights are trained, including the shared CNN that embeds visual observations, the lexicon of component networks, and the direction to extend the search tree. Next, these three sets of weights are fixed while the proposal layer is fine-tuned to predict the likelihood of a state being a goal state of a plan. This fine-tuning step significantly increase performance without requiring more training data because the proposal layer gains experience with how to interpret the output of the network without the network also changing its behavior.

The model illustrated by FIGS. 1-2 is trained with little data—only sentences paired with demonstrations. The model operates efficiently in continuous environments. The structure of the model is intelligible and derived from linguistic principles, while its reasoning is made overt by the explicit use of attention maps.

IV. Experiments

To evaluate the model, a procedure of task and training set generation is employed. Baseline models are further employed. Then, the ability the ability of the model to carry out novel commands. Further, the ability to generalize to novel features in the environment, generalize to multiple sentences, and handle real-world commands generated by users are tested.

A. Dataset

FIG. 3A is a diagram 300 illustrating example embodiments of the training set. FIG. 3B is a diagram 350 illustrating example embodiments of the test set. In FIGS. 3A and 3B, robots 302*a-d* and 352*a-d* are shown as a pair of orange L-shaped grippers. Other objects are randomly positioned with random properties and orientations. The training set is considerably simpler, having fewer objects on average, and without certain complexities, such as being free of (e.g., without): cups that have lids, the need to traverse doors or channels (as all objects are inside the room), and immovable obstacles (e.g., grey rectangles).

A generative model creates new training and test maps conditioned on a target command that is sampled from a grammar. The space of possible maps is large and can include features such as rooms of varying sizes (e.g., 0-4 narrow gaps), a door to the outside, and 2-8 objects with multiple properties (e.g., shape, color, and size). The grammar generates commands including seven verbs (e.g., push, grab, approach, touch, open, leave, carry), seven nouns (e.g., block, cup, ball, triangle, quadrilateral, house, cart), eight colors (e.g., red, green, blue, pink, yellow, black, purple, orange), two sizes (e.g., big, small), nine spatial relations (e.g., left of, right of, top of, bottom of, on the left of, on the right of, near, above, below), and two prepositions (e.g., towards, away from). Each of these linguistic constituents becomes a component neural network in a lexicon of networks. Sentences are parsed with the NLTK coreNLP parser and unknown words in the sentences are mapped to nearby words using their distance in WordNet.

Given all possible objects, distractors, room sizes, doors, gateways, object locations, color, rotation, and size, a random map is generated. The target plan is verified to be feasible, in principle, on this map. The same map never appears in both the training and the test sets. This provides an immense space from which to generate maps and to test model generalization capabilities.

As described above, no existing model can accept, as input, linguistic commands and plan in the environments used here. To evaluate models of the present disclosure, several baselines are used. The weakest baseline, NN-Only, is a model without the planner but including the hierarchical neural network. A more powerful baseline, BoW, is given the added task of predicting when a configuration of the robot is a terminal. A collection of neural networks represents the meaning of a sentence, but they do not interact with one another. Rather, these networks form the bag of words. This model is novel, but considerably weaker as there is no relationship between the words and no explicit encoding of the structure of the sentence. The neural network used in that model is also modified to predict both a direction to move in and the probability of ending the action, which is similar to Applicant's model disclosed above, but using a single neural network.

Finally, the testing compares the above model against a model, RRT+Oracle, which represents the performance that can be expected if the hierarchical network is operating well. This model employs the same underlying planner but the goal regions are manually specified using an oracle. For any position in the configuration space of the robot and the configuration space of all the objects, the oracle determines if the behavior of the robot has satisfied some natural language utterance. Equaling this strong related model in performance demonstrates that the network is acquiring the meanings of words.

FIG. 4 is a table illustrating a success rate of executing natural language commands with two concepts (e.g., the number of models used during training), and five or six concepts (e.g., more complex sentences than used during training). All models sampled 500 nodes in the configuration space of the robot. Applicant's model generalizes well and faithfully encodes the meaning of commands. While the BoW model is also novel, it lacks the internal structure to represent many sentences and significantly underperforms our hierarchical model.

FIG. 4 is a table 400 illustrating testing of the model to determine if it can acquire the meanings of words and use this to represent never-before-seen sentences. Note that little is annotated here: only pairs of demonstrations and sentences related to those demonstrations exist. Also note that for all experiments, test training and test maps and utterances were disjoint.

In a generated training set of 6099 utterances containing at most four concepts, with each utterance being demonstrated on a new map. The test set included 657 utterances paired with maps that do not appear in the training set and are generally considerably more complex, as shown in FIGS. 3A-B. The model presented here had by far the highest success rate (72%) and generalized best to more complex sentences. At training time, sentences with up to four concepts have been tested, while at test time, more complex sentences were included. The model is generalized to these longer sentences despite not having seen anything like them at training time.

Since the model affects the search direction of RRT (e.g., the growth of the search tree) it outperformed the RRT+ Oracle model. The RRT+Oracle model has a perfect understanding of the sentence in terms of determining which nodes satisfy the command, but lacks the ability to use the sentence to guide its actions. This demonstrates that the model presented here faithfully encodes commands and executes them well in complex environments, on new maps, even when those commands are much more complex than those seen in the training set.

D. Additional Obstacles and Preconditions

FIG. 5 is a table 500 illustrating a success rate of different baselines and models when generalizing to environments that have properties that are not expected at training time. Note that, the NN-Only model which does not include a planner, fails to generalize. Models which do include a planner generalize much better to new problems.

Robots continually deal with new difficulties (e.g., obstacles, environments, etc.). To evaluate the capacity of models to adapt to new problems, the test set is modified to include other features not present at training time, as shown in FIG. 5. In particular, four random fixed obstacles are added and the test requires that the robot traverse a push-button-controlled door. In addition, the frequency of objects inside cups with lids is significantly increased.

The model which does not include a planner, the NN-Only model, has great difficulty generalizing to new scenarios. All the other models generalized far better, with the present model performing roughly on par with the oracle. These results indicate that planners provide robustness when encountering new challenges, which is known in symbolic planning but has not been exploited as part of an end-to-end approach before.

E. Multiple Sentences

FIG. 6 is a table 600 illustrating a success rate of each model per number of sentences. All models are trained on a single utterance and are then required to follow a sequence of commands. Every model is allowed to sample 600 nodes in the configuration space of the robot. As more commands are added, the difficulty of carrying out a task increases and the NN-Only model is quickly overwhelmed. The BoW model performs at roughly half of the performance of ours. The present model has performance comparable to that of the oracle. Sampling more nodes increases the success rate of all models.

It is unlikely that robots are required to carry out just one command at a time. Most plans include a sequence of actions that depend on one another. For this test, robots are evaluated on a version of this task where all models are only trained on a single sentence and then must generalize to sequences of between two and three commands, as shown in FIG. 6. Despite this significant limitation at training time, the present approach outperforms the baselines significantly. The NN-Only model is unable to generalize. The BoW model has roughly half the performance of the present model. The present model has similar properties to that of the oracle, which has the correct encoding of the sentence, thus showing that our model represents sequences of sentences despite not being trained on any sequences of commands.

F. User Study

Five-hundred generated map and command pairs and were executed by the robot. The executions of these commands, but not the commands themselves, were shown to four users recruited for this experiment. Users were asked to produce the instructions they would provide to the robot to elicit the behavior they observed. Out of 500 descriptions, 128 were impossible for the robot to follow due to user error (e.g., by mentioning objects that are physically not there, or could not be reasonably parsed). The 372 remaining descriptions had an average length of 9.04 words per sentence standard deviation of 2.49. The baseline NN-Only model achieved 17% success rate, the BoW model succeeded 40% of the time, while our model succeeded 49% of the time. The RRT+Oracle model had roughly the same performance as ours succeeding 51% of the time. This demonstrates that the present approach scales to real-world user input.

A hierarchical network can work in conjunction with a sampling-based planner to create a model that encodes the meaning of commands. It learns to execute novel commands in challenging new environments that contain features not seen in the training set. The present approach scales to real-world sentences produced by users.

The present model provides a level of interpretability. The structure of the model overtly mirrors that of the parse of a sentence making it easy to verify if a sentence has been incorrectly encoded. Attention maps are used throughout the hierarchical network to allow component parts to communicate with one another. These provide another means by which to understand which components caused a failure, as illustrated further by example attention maps of FIG. 7 for failed commands and the level of explanation possible along with its limitations. In many cases, this provides both reassurances that errors are pinpointed to the responsible part of the model and confidence in the chosen model. This level of transparency is unusual for end-to-end models in robotics.

Figure 7:
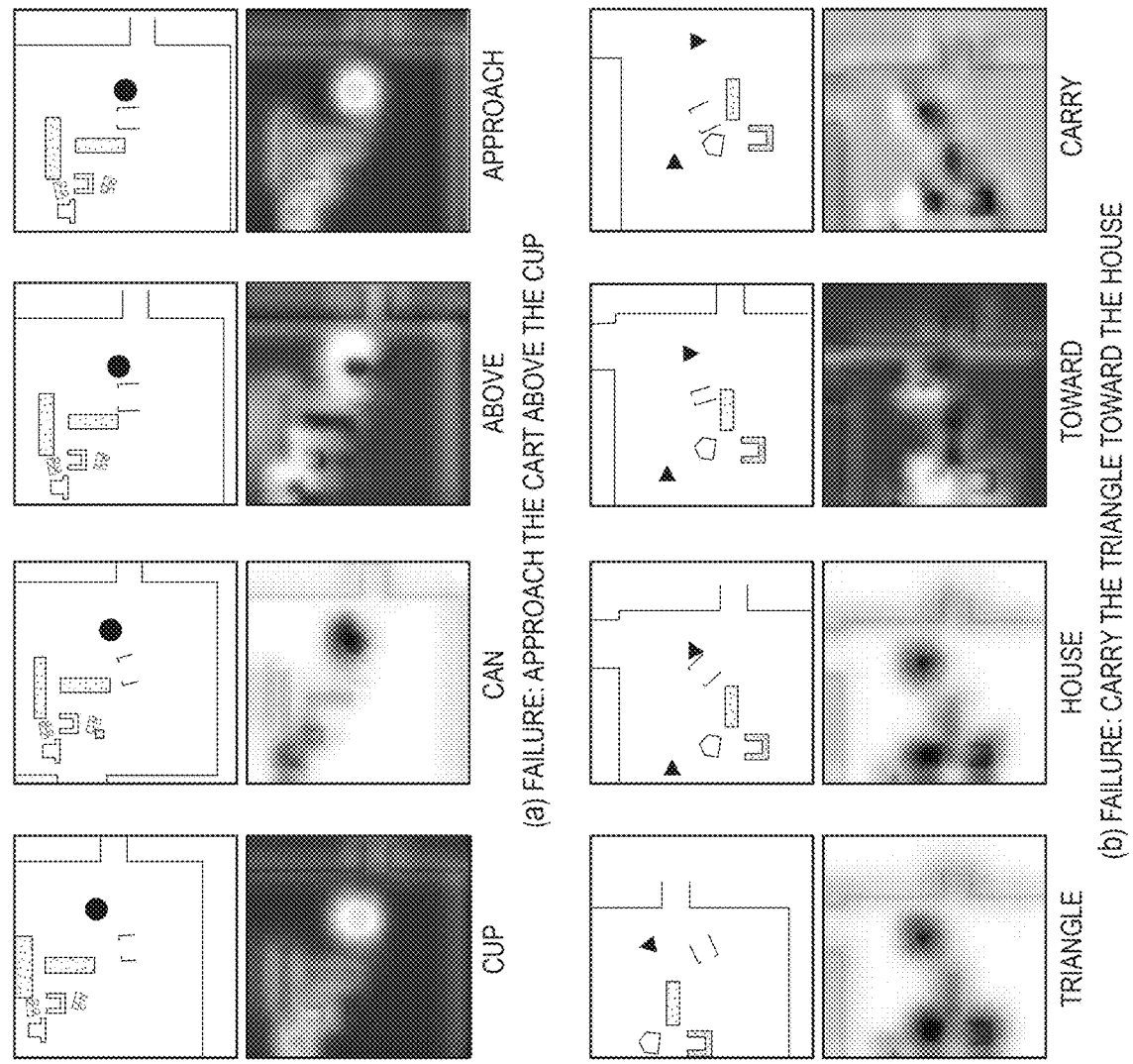
FIG. 7 are snapshots illustrating examples of interpretability from execution of the model.

FIG. 7 are a collection of snapshots 700 illustrating examples of interpretability from execution of the model. The robot perspectives 710 and 720 represent the local information available to the robot, rather than the entire map. The attention maps 712 and 722 are produced by each component network in the model at a critical time in the execution of two commands which were not carried out correctly. In relation to the attention maps, the polarity of the attention maps is irrelevant because models can communicate by either suppressing or highlighting features and neither carries any a priori valence. In the examples illustrated in robot perspective 710 and corresponding attention maps 712, the robot 702a-d fails to pick up the correct object and heads to the circle instead. This failure is explained by the poor detection of the cup seemingly confusing it with the circle.

In the examples illustrated by robot perspective 720 and corresponding attention maps 722, the model goes to the triangle but then fails to pick it up before heading to the house. The failure is not explained by the attention maps, as they correctly highlight the relevant objects—instead the model seems to have positioned itself incorrectly to perform the attempted pick up and it does not recognize the failure of that action. This level of interpretability is not perfect for every failure case, but does explain many problems pointing the way for how to improve the model and its training regime.

Figure 8:
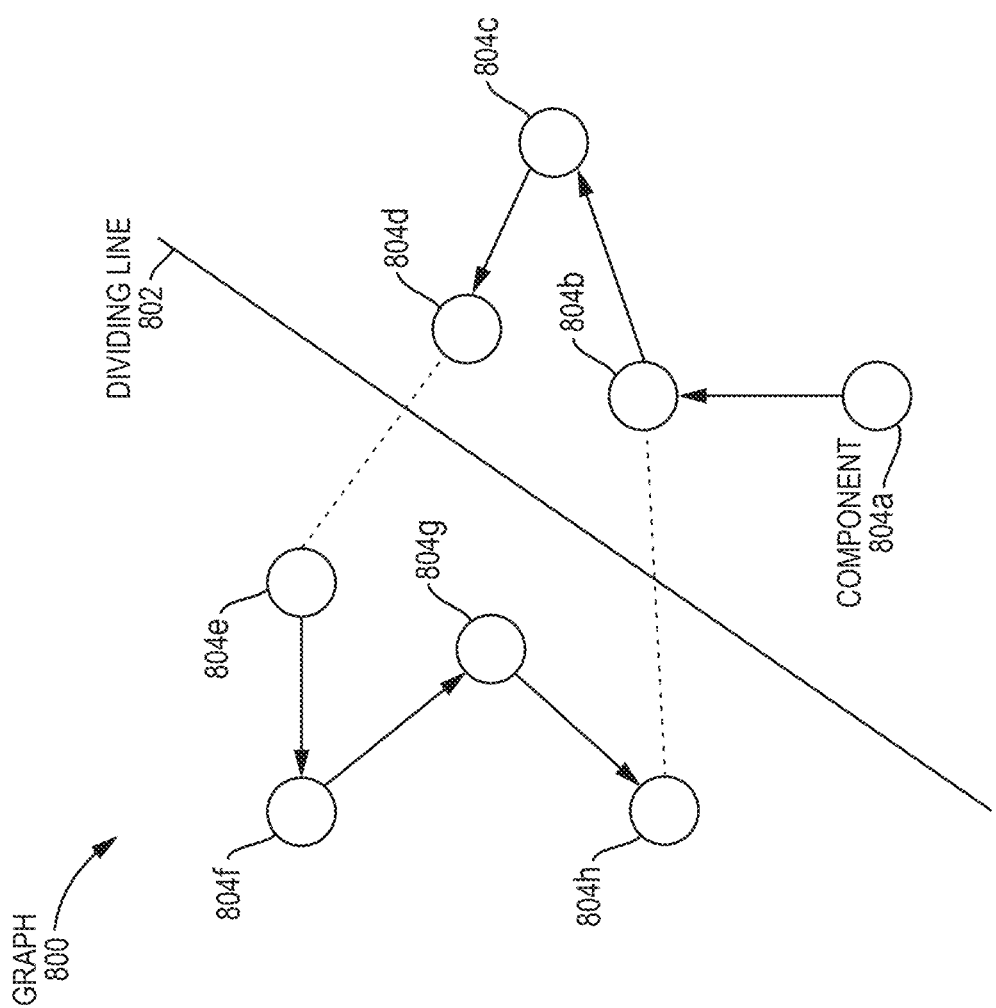
FIG. 8 is a diagram illustrating an example embodiment of a directed graph within an NN.

FIG. 8 is a diagram illustrating a graph 800 having a dividing line 802 in an example embodiment of the present disclosure. The dividing line 802 disables communication between the two sections (e.g., nodes 804a-d and nodes 804e-h) of the graph 800. The directed graph connections are shown to be disabled by having dashed lines crossing the dividing line 802. Otherwise, components 804a-h make up the graph, where components 804a-d make up a first set of nodes/components, and 804e-h make up a second set. The graph 800 is part of a neural network (NN). Communication between the first set and second set of the graph 800 of the NN is enabled via an attention map. In other words, the communication between the two is modulated by an attention map.

Figure 9A:
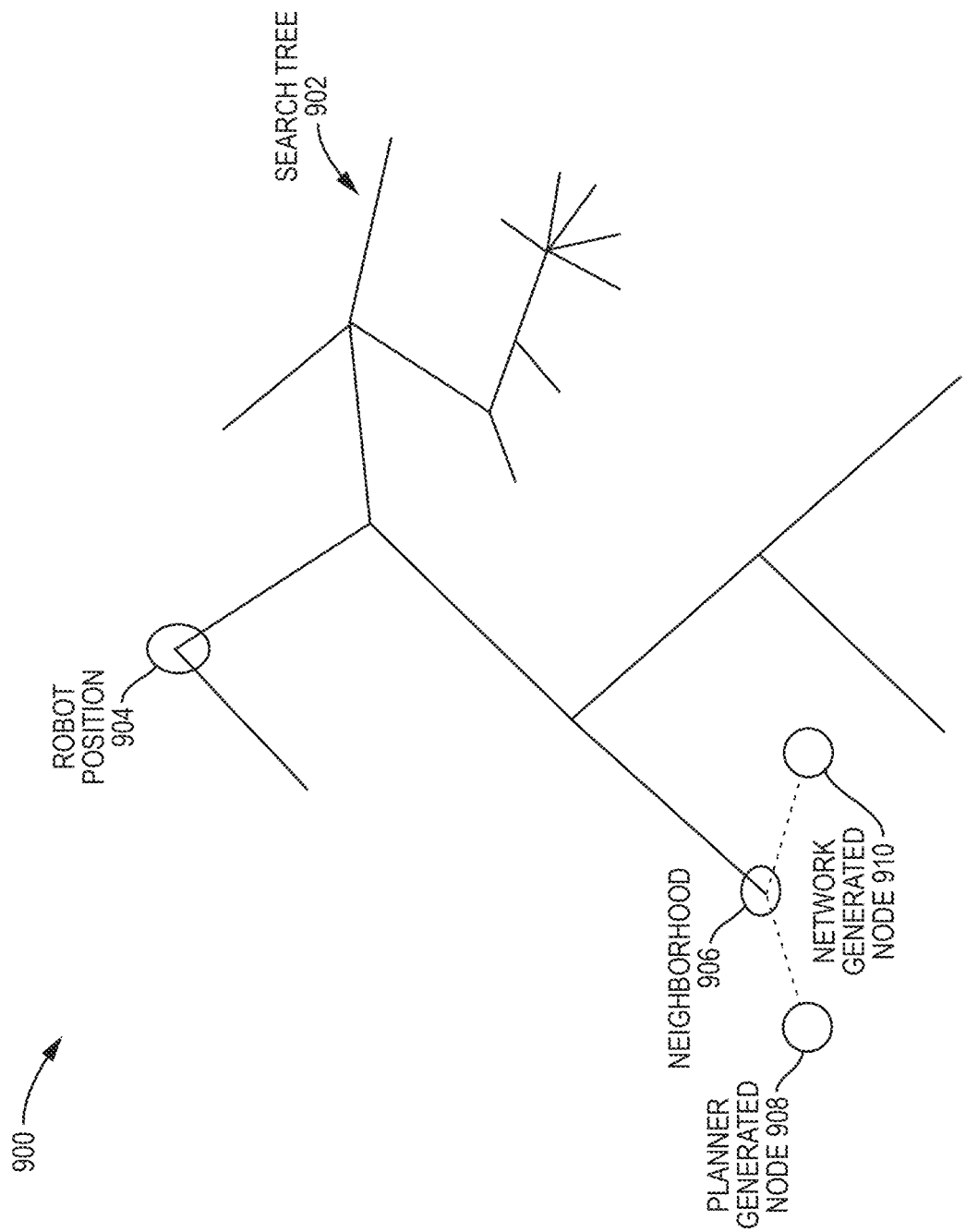
FIG. 9A is a diagram illustrating an example embodiment of growing a search tree representing a configuration space employed by the present disclosure.

FIG. 9A is a diagram 900 illustrating an example embodiment of growing a search tree 902 representing a configuration space employed by the present disclosure. The search tree 902 includes a current robot position 904. The method of the present disclosure determines a neighborhood 906 from which to expand the search tree 902 using a planner. A person having ordinary skill in the art can recognize that in other embodiments, a neural network can also determine the neighborhood 906. Once the neighborhood is selected, a planner generates a planner generated node 908 and a neural network generates a network generated node 910. The method then arbitrates among these two nodes, where the arbitration includes a statistical confidence of each respective node 908 and 910, determining whether a path to each node is possible (e.g., whether a wall blocks the path, for example), or another extrinsic factor. Extrinsic factors include likelihood to avoid an obstacle, likelihood to fit through an opening (e.g., a hole in the wall), likelihood of passing a safety margin, a workspace rule (e.g., custom), or an arbitrary list of rules. Then, the arbitrated node is added to the search tree 902. The process can be iterated over multiple cycles.

To select a node in the search tree (e.g., in the selected neighborhood) to expand, the method annotates each node in the search tree with two values: (1) the probability evaluated by the NN conditioned on the node's parent; and (2) the probability of being chosen the node by the RRT (e.g., the planner). The probability of being chosen the node by the RRT is approximated by generating many free-space samples and computing the number of nearest free-space samples to the tree nodes.

Figure 11A:
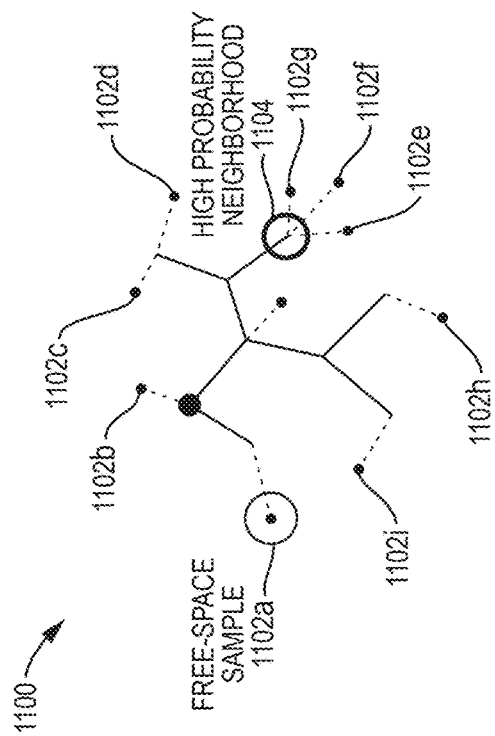
FIG. 11A is a diagram illustrating neighborhood selection in the search tree.

FIG. 11A is a diagram 1100 illustrating such neighborhood selection. In FIG. 11A, free space samples 1102a-i of a search tree are shown. FIG. 11A further illustrates a high probability neighborhood 1104 that may be selected as a point from which to expand the search tree. The tree node has more nearest free-space samples has higher probability evaluated by the planner.

Figure 11B:
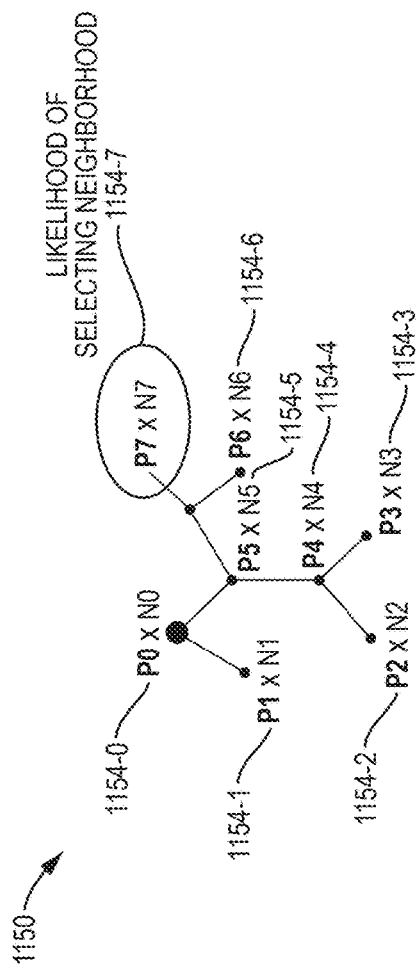
FIG. 11B is a diagram illustrating examples of determining probabilities for selecting each node.

FIG. 11B is a diagram 1150 illustrating examples of determining probabilities for selecting each node. The probability is a judgment of network or planner of a likelihood of success if it extends. The planner assigns a probability for every node of the tree, and samples a node from that distribution. The planner assigns the probability by scoring every single node in the tree for probability of extending the tree in this neighborhood. The neural network also assigns a probability to every generated hypothetical node. What results is two probability distributions and samples for joint distribution of both. With regards to selecting a neighborhood, in an embodiment probabilities can be combined to arbitrate between the planner and neural network selected neighborhoods.

The method then multiples and normalizes these two probabilities for each node 1154-0-1154-7, and samples the tree node based on the combined probabilities. Probabilities $P_0$-$P_7$ are respective probabilities evaluated by the planner and $N_0$-N7 are the respective probabilities given by the neural network. This focuses search in areas where plans are likely to succeed, without allowing the neural network to get stuck in one region because as a region is more saturated with samples, the likelihood that RRT planner would continue to extend the tree in it decreases.

The neural network and planner work together to select the neighborhood and the point so that they balance out each other's biases. For example, if a neural network were to determine a neighborhood on its own, it would focus on very close places within the configuration space. Therefore, the planner can help diversify the neural network's selections.

For two different nodes, arbitration can occur similarly, or arbitration includes a statistical confidence of each respective node 908 and 910, determining whether a path to each node is possible (e.g., whether a wall blocks the path, for example), or another extrinsic factor.

Figure 9B:
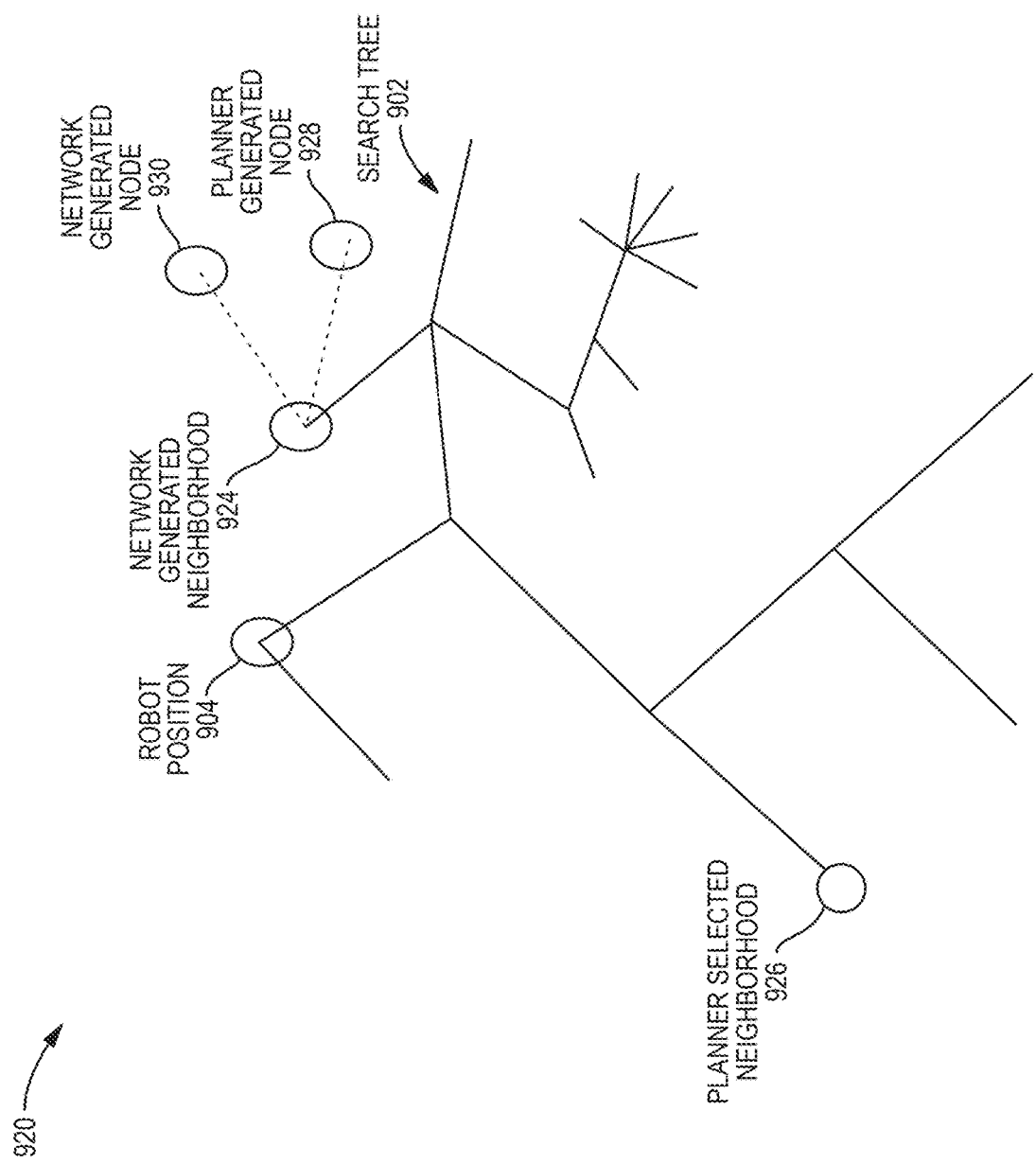
FIG. 9B is a diagram illustrating an example embodiment of growing a search tree representing a configuration space employed by the present disclosure.

FIG. 9B is a diagram 920 illustrating an example embodiment of growing a search tree 902 representing a configuration space employed by the present disclosure. The search tree 902 includes a current robot position 904. The method of the present disclosure determines a planner selected neighborhood 926 from which to expand the search tree 902 using a planner, and a network generated neighborhood 924 using a neural network. The method then selects among the network generated neighborhood 924 and planner selected neighborhood 926. FIG. 9B illustrates that network generated neighborhood 924 is selected, however, the same principles would apply in the scenario where the planner selected neighborhood 926 is selected. Once the neighborhood is selected, a planner generates a planner generated node 928 and a neural network generates a network generated node 930. A person having ordinary skill in the art can recognize that the planner selecting the neighborhood can be either the same planner or a different planner than the planner generating the planner generated node 928. A person having ordinary skill in the art can recognize that the neural network selecting the neighborhood can be either the same neural network or a different neural network than the neural network generating the neural network generated node 930. The method then arbitrates among these two nodes, where the arbitration includes a statistical confidence of each respective node 928 and 930, determining whether a path to each node is possible (e.g., whether a wall blocks the path, for example), or another extrinsic factor. Then, the arbitrated node is added to the search tree 902. The process can be iterated over multiple cycles.

Figure 9C:
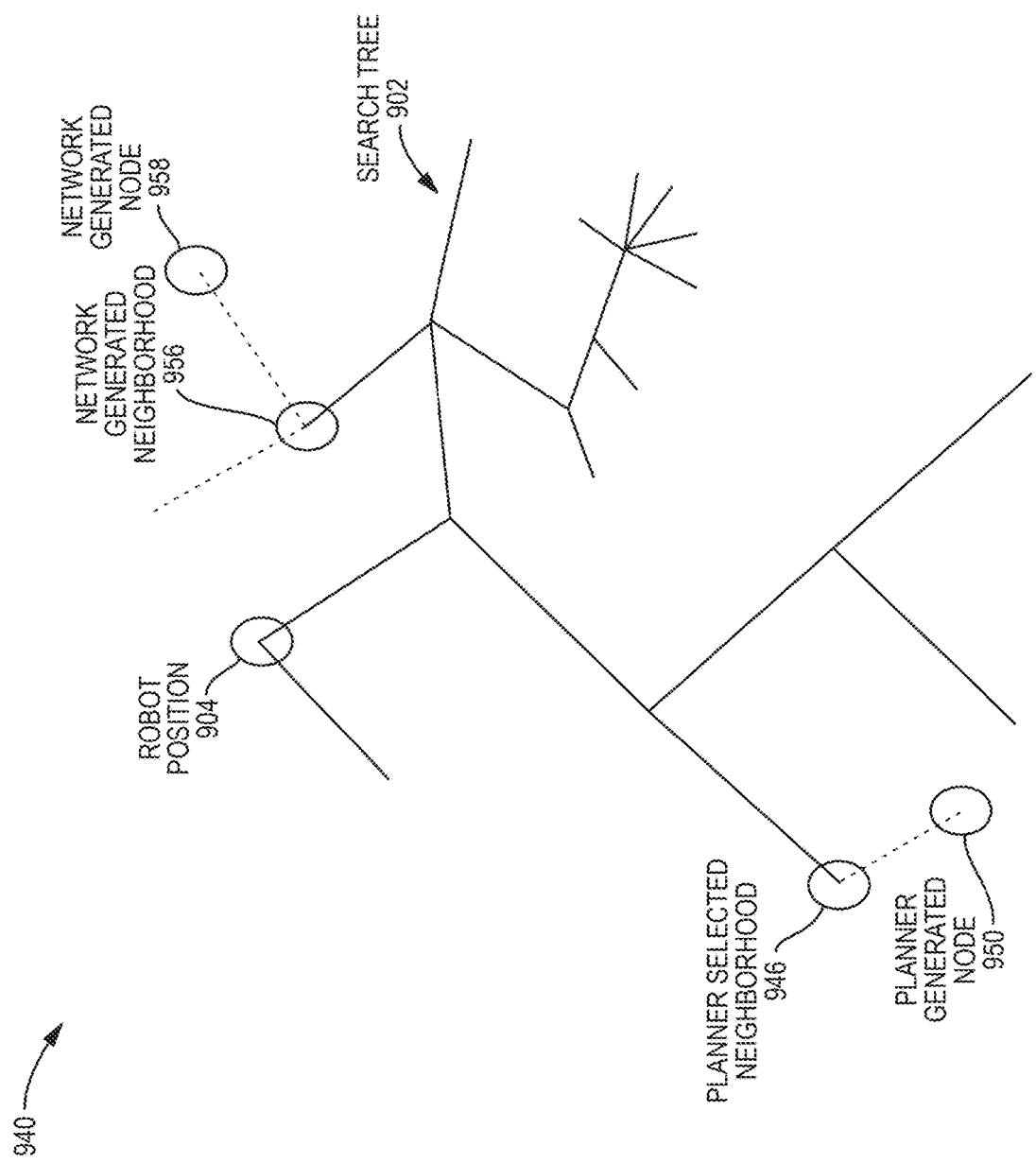
FIG. 9C is a diagram illustrating an example embodiment of growing a search tree representing a configuration space employed by the present disclosure.

FIG. 9C is a diagram 940 illustrating an example embodiment of growing a search tree 902 representing a configuration space employed by the present disclosure. The search tree 902 includes a current robot position 904. The method of the present disclosure determines a planner selected neighborhood 946 from which to expand the search tree 902 using a planner. The planner further selects a planner generated node 950. The method of the present disclosure determines a network generated neighborhood 946 from which to expand the search tree 902 using a neural network. The neural network further selects a network generated node 958. Once both nodes 950 and 958 are generated, method then arbitrates among these two nodes 950 and 958, where the arbitration includes a statistical confidence of each respective node 950 and 958, determining whether a path to each node is possible (e.g., whether a wall blocks the path, for example), or another extrinsic factor. Then, the arbitrated node is added to the search tree 902. The process can be iterated over multiple cycles.

Figure 10A:
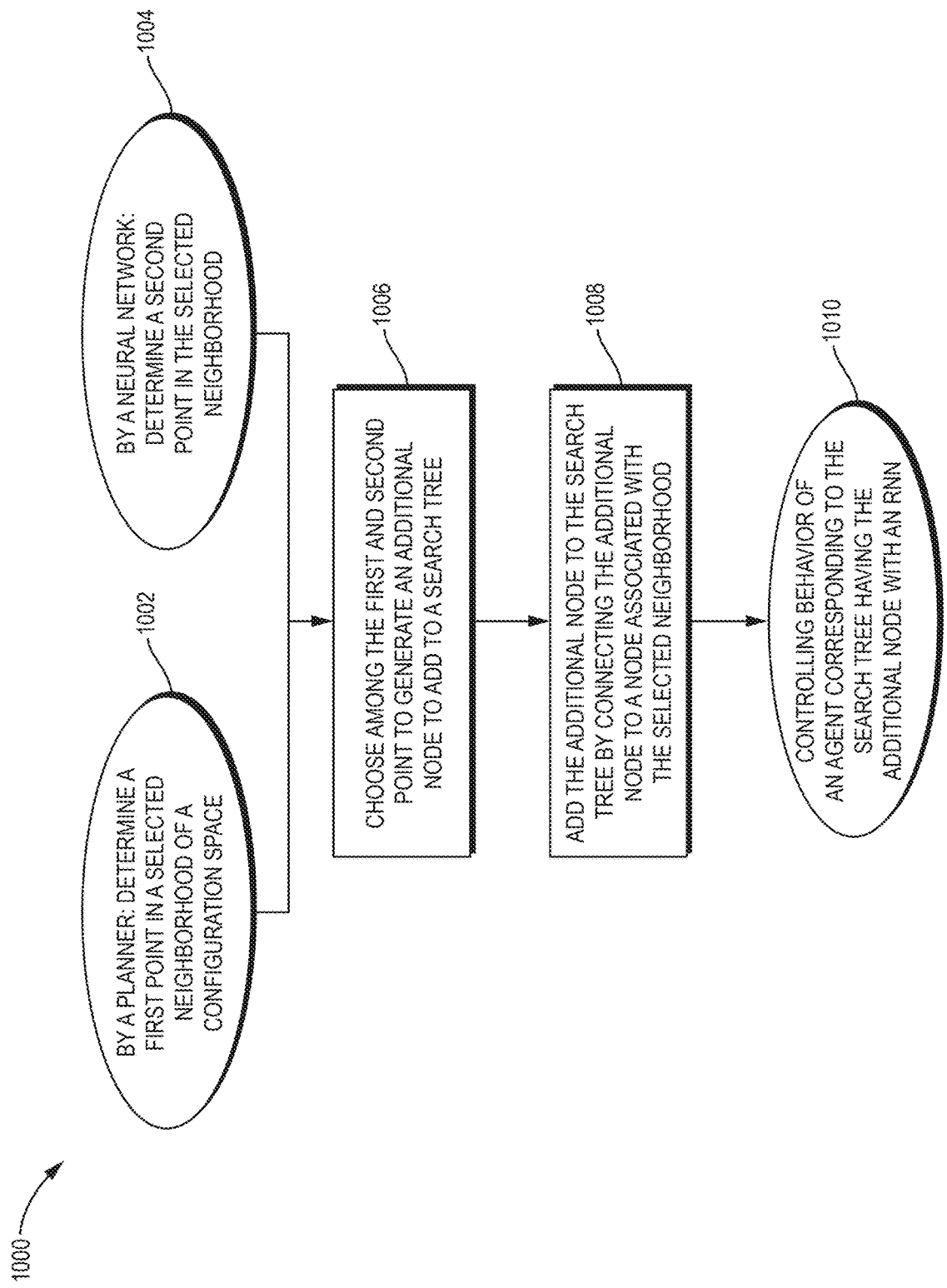
FIGS. 10A-C are flow diagrams illustrating example embodiments of the present disclosure.
Figure 10B:
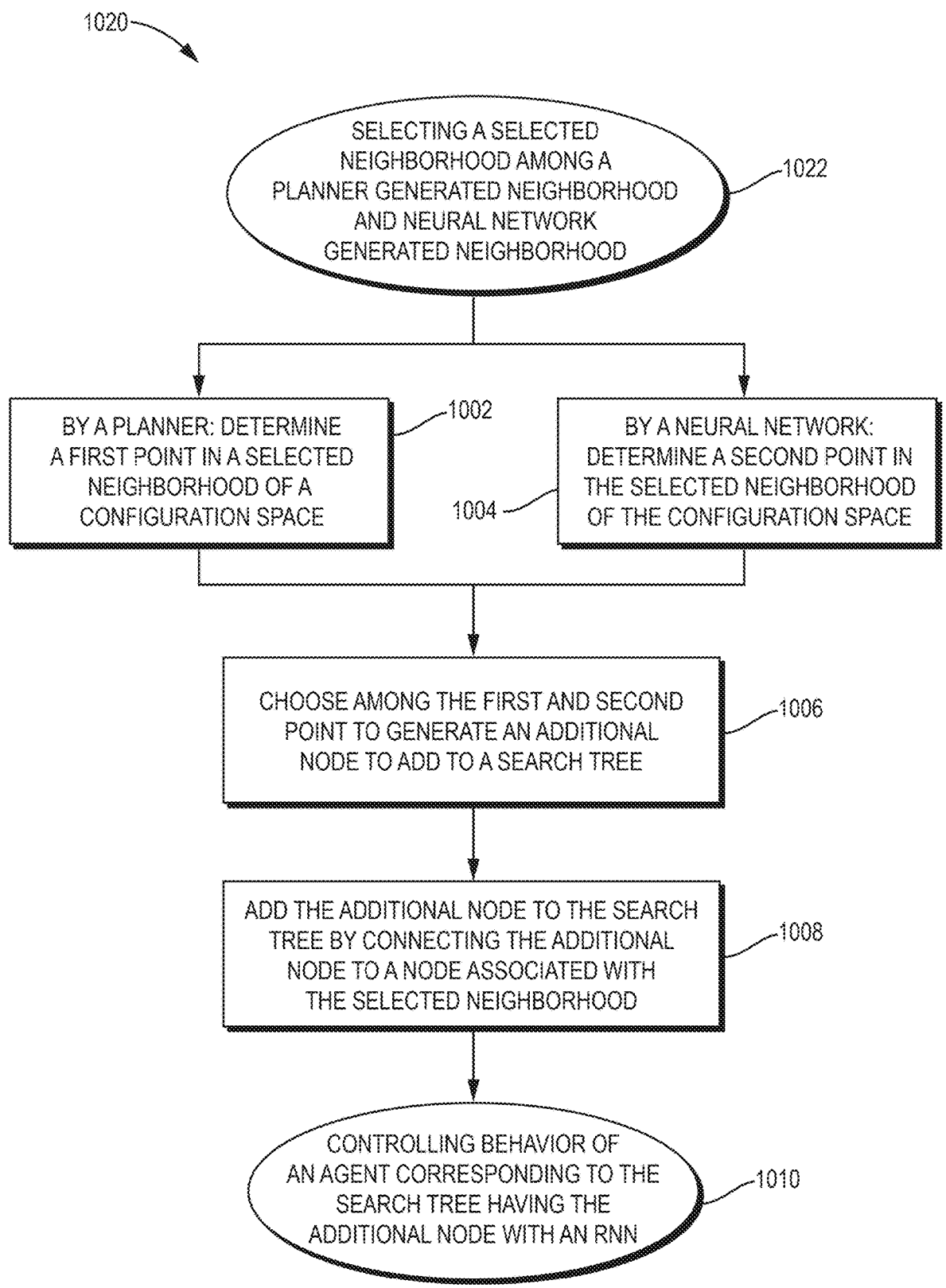
Figure 10C:
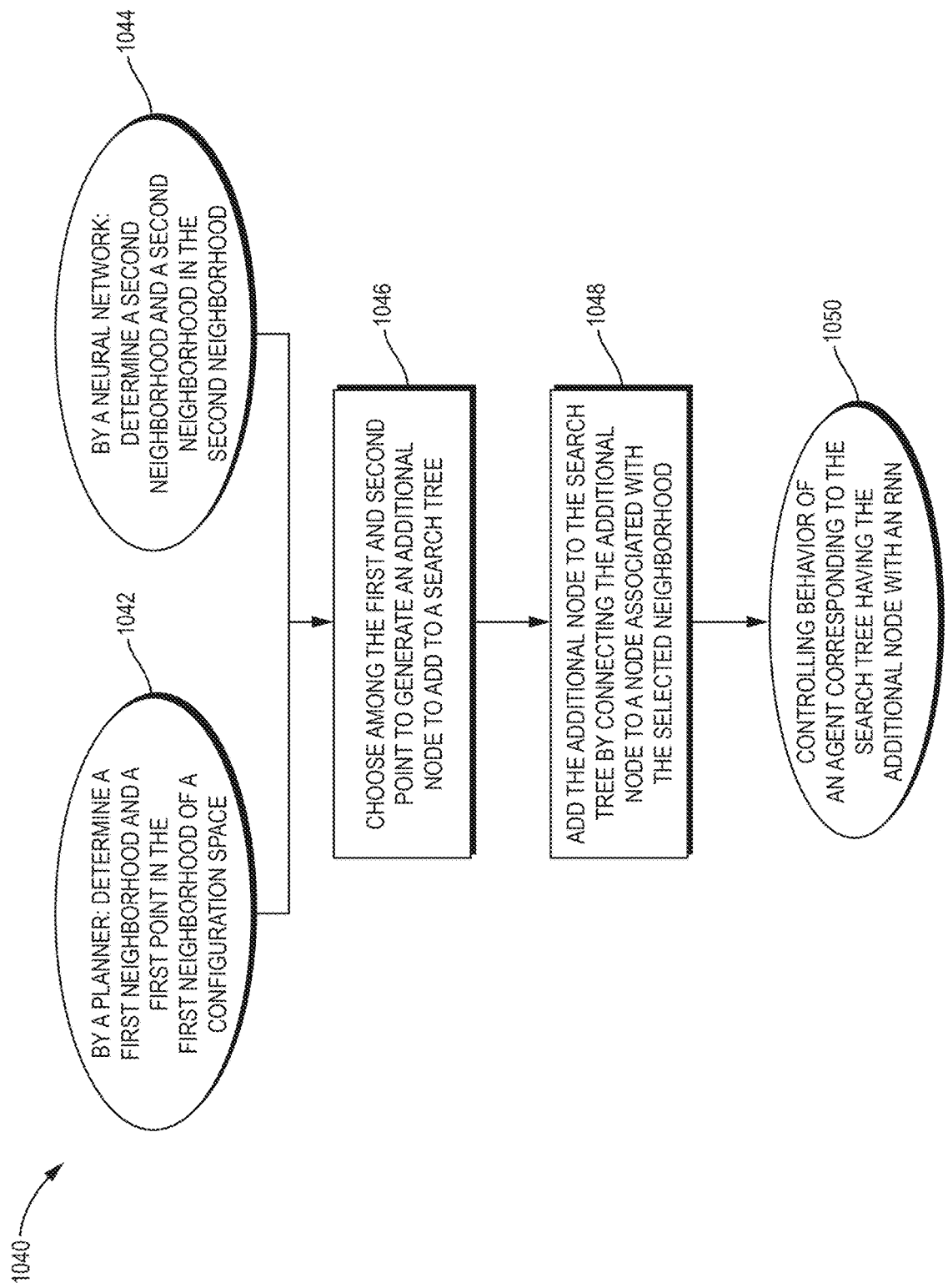

FIGS. 10A-C are flow diagrams 1000, 1020, and 1040 illustrating example embodiments of the present disclosure. FIG. 10A is a diagram 1000 illustrating a method that determines a first point in a selected neighborhood in a configuration space by a planner (1002) and determines a second point in a selected neighborhood in the configuration space by a neural network (1004). A person having ordinary skill in the art can recognize that these determinations (e.t., 1002 and 1004) can be performed sequentially in any order, or in parallel. In this embodiment, the selected neighborhood can be selected by a planner alone, a neural network alone, or an arbitration between planner and neural network generated neighborhoods. The method then chooses among the first and second point to generate an additional node to add to a search tree (1006). The method then adds the additional node to the search tree by connecting the additional node to a node associated with the selected neighborhood (1008). The method then controls the behavior of an agent corresponding to the search tree having the additional node with a neural network (NN) (1010).

FIG. 10B is a diagram 1020 illustrating a method of another embodiment of the present disclosure. First, the method selects a selected neighborhood among a planner generated neighborhood and neural network generated neighborhood (1022). This determination can be performed by determining a first neighborhood to add a node to a search tree by evaluating one or more selected nodes of the search tree with a planner, each node representing a sample location in the configuration space, determining a second neighborhood to add a node to the search tree by evaluating the one or more selected nodes of the search tree with a neural network, and choosing a selected neighborhood among the first neighborhood and second neighborhood based on at least one of a respective level of confidence determined for the first neighborhood and second neighborhood, at least one extrinsic factor, and an impossibility factor.

Once the selected neighborhood is determined, the method then chooses among the first and second point to generate an additional node to add to a search tree (1006). The method then adds the additional node to the search tree by connecting the additional node to a node associated with the selected neighborhood (1008). The method then controls the behavior of an agent corresponding to the search tree having the additional node with a neural network (NN) (1010).

FIG. 10C is a diagram 1040 illustrating a method of another embodiment of the present disclosure. The method first determines a first neighborhood and a first point in the first neighborhood in a configuration space by a planner (1042), and determines a second neighborhood and a second point in the second neighborhood in the configuration space by a neural network (1042). The method then chooses among the first point and second point to generate an additional node to add to a search tree (1046). The method then adds the additional node to the search tree by connecting the additional node to a node associated with the selected neighborhood (1048). The method then controls the behavior of an agent corresponding to the search tree having the additional node with a neural network (NN) (1050).

Figure 12:
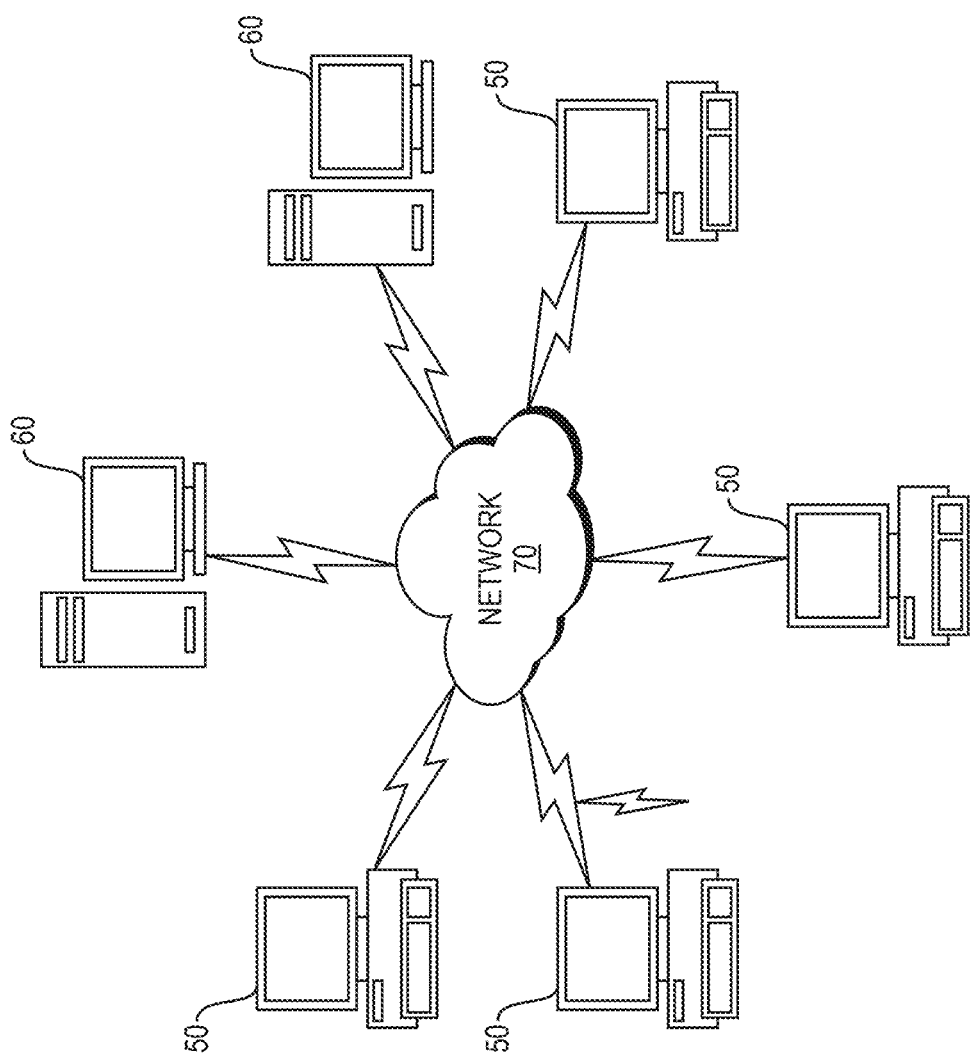
FIG. 12 illustrates a computer network or similar digital processing environment in which embodiments of the present invention may be implemented.

FIG. 12 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 13:
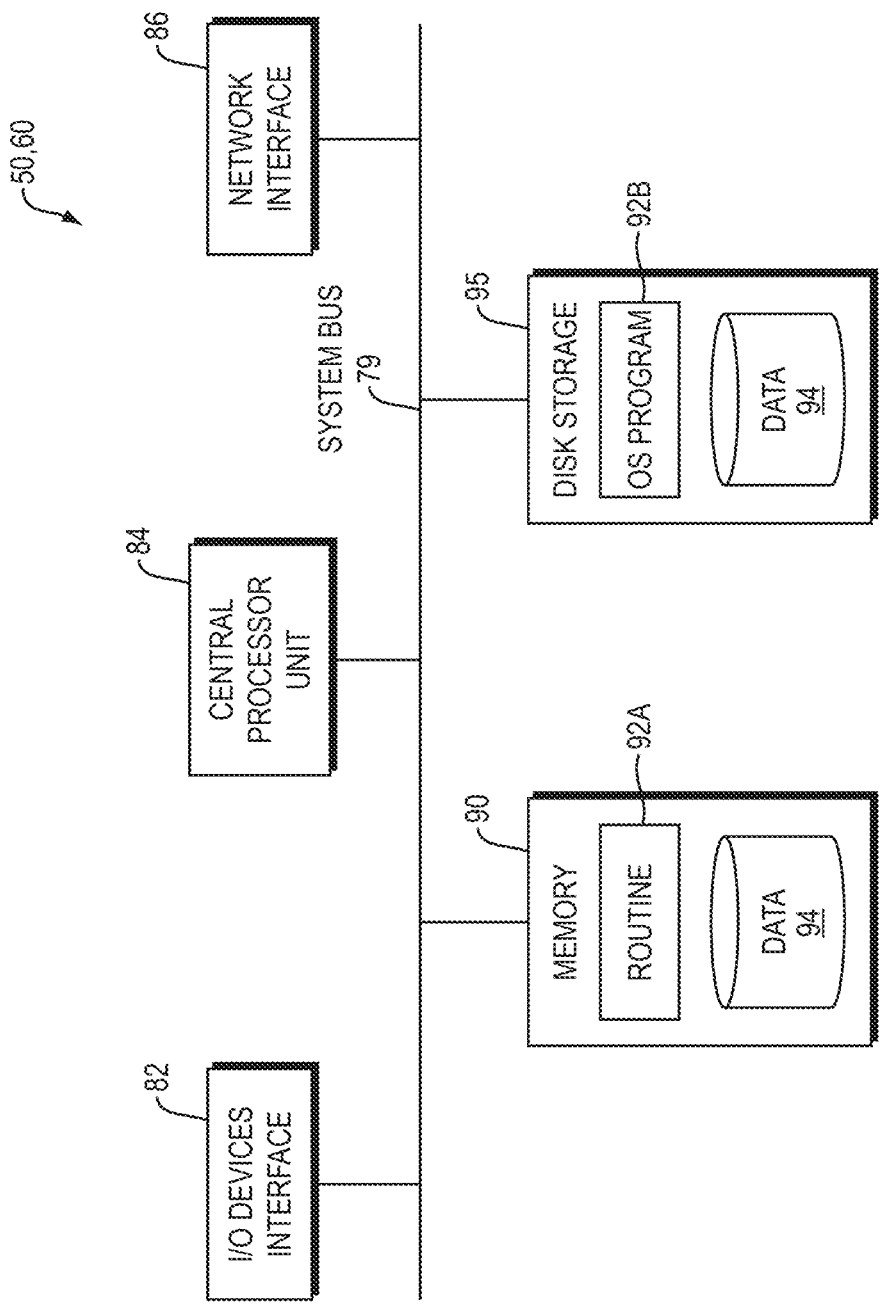
FIG. 13 is a diagram of an example internal structure of a computer (e.g., client processor/device or server computers) in the computer system of FIG. 12.

FIG. 13 is a diagram of an example internal structure of a computer (e.g., client processor/device 50 or server computers 60) in the computer system of FIG. 12. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 5). Memory 90 provides volatile storage for computer software instructions 92 and data 94 used to implement an embodiment of the present invention (e.g., planner module, neural network module, arbitration module code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method comprising:
   determining, by a planner, a first point in a selected neighborhood of a configuration space;
   receiving a natural language input, uttered by a human or generated by a computer;
   parsing the received natural language input to determine (i) linguistic structure of the natural language input and (ii) a plurality of words in the natural language input;
   modifying a first neural network (NN) to encode the determined linguistic structure of the natural language input by arranging a plurality of component neural networks of the first NN in an order corresponding to the determined linguistic structure of the natural language input, wherein each component neural network corresponds to one or more respective words of the determined plurality of words;
   determining, by the modified first NN, a second point in the selected neighborhood of the configuration space;
   choosing among the first point and second point to generate an additional node to add to a search tree; and
   adding the additional node to the search tree by connecting the additional node to a node associated with the selected neighborhood;
   wherein a second NN controls behavior of an agent corresponding to the search tree having the additional node.

2. The method of claim 1, further comprising:
   determining the selected neighborhood by:
      determining a first neighborhood to add the additional node to the search tree by evaluating one or more selected nodes of the search tree with the planner, each selected node representing a coordinate in the configuration space;
      determining a second neighborhood to add the additional node to the search tree by evaluating the one or more selected nodes of the search tree with the modified first NN; and
      choosing, as the selected neighborhood, one neighborhood among the first neighborhood and second neighborhood based on at least one of: a respective level of confidence determined for the first neighborhood and second neighborhood, at least one extrinsic factor, and an impossibility factor indicative of whether a path to each node of the selected neighborhood is possible.

3. The method of claim 1, wherein choosing includes producing hypotheses for the planner and for the modified first NN, the hypotheses including at least one of confidence weights and features.

4. The method of claim 1, wherein choosing includes evaluating one or more nodes of the search tree with the planner or the modified first NN, said evaluating being based on observations.

5. The method of claim 1, wherein the second NN includes component NNs.

6. The method of claim 1, wherein the second NN outputs to the agent at least one of a path, destination, and stopping point.

7. A system comprising:
   a processor; and
   a memory with computer code instructions stored thereon, the processor and the memory, with the computer code instructions, being configured to cause the processor to:
      determine, by a planner, a first point in a selected neighborhood of a configuration space;
      receive a natural language input, uttered by a human or generated by a computer;
      parse the received natural language input to determine (i) linguistic structure of the natural language input and (ii) a plurality of words in the natural language input;
      modify a first neural network (NN) to encode the determined linguistic structure of the natural language input by arranging a plurality of component neural networks of the first NN in an order corresponding to the determined linguistic structure of the natural language input, wherein each component neural network corresponds to one or more respective words of the determined plurality of words,
      determine, by the modified first NN, a second point in the selected neighborhood of the configuration space;
      choose among the first point and second point to generate an additional node to add to a search tree; and
      add the additional node to the search tree by connecting the additional node to a node associated with the selected neighborhood;
      wherein a second NN controls behavior of an agent corresponding to the search tree having the additional node.

8. The system of claim 7, wherein choosing includes producing hypotheses for the planner and for the modified first NN, the hypotheses including at least one of confidence weights and features.

9. The system of claim 7, wherein the instructions further configure the processor to:
   determine the selected neighborhood by:
      determining a first neighborhood to add the additional node to the search tree by evaluating one or more selected nodes of the search tree with the planner, each selected node representing a coordinate in the configuration space;
      determining a second neighborhood to add the additional node to the search tree by evaluating the one or more selected nodes of the search tree with the modified first NN; and
      choosing as the selected neighborhood, one neighborhood among the first neighborhood and second neighborhood based on at least one of: a respective level of confidence determined for the first neighborhood and second neighborhood, at least one extrinsic factor, and an impossibility factor indicative of whether a path to each node of the selected neighborhood is possible.

10. A method comprising:
    determining, by a planner, a first neighborhood of a configuration space and a first point in the first neighborhood;
    receiving a natural language input, uttered by a human or generated by a computer;
    parsing the received natural language input to determine (i) linguistic structure of the natural language input and (ii) a plurality of words in the natural language input;
    modifying a first neural network (NN) to encode the determined linguistic structure of the natural language input by arranging a plurality of component neural networks of the first NN in an order corresponding to the determined linguistic structure of the natural language input, wherein each component neural network corresponds to one or more respective words of the determined plurality of words;

determining, by the modified first NN, a second neighborhood of a configuration space and a second point in the second neighborhood;

choosing as a selected neighborhood, one neighborhood among the first neighborhood and second neighborhood based on at least one of: a respective level of confidence determined for the first neighborhood and second neighborhood, at least one extrinsic factor, and an impossibility factor indicative of whether a path to each node of the selected neighborhood is possible;

choosing among the first point and second point to generate an additional node to add to a search tree; and adding the additional node to the search tree by connecting the additional node to a node associated with the selected neighborhood;

wherein a second NN controls behavior of an agent corresponding to the search tree having the additional node.

11. The method of claim 1, wherein the first neural network and the second neural network are component neural networks of a given neural network.

12. The system of claim 7, wherein the first neural network and the second neural network are component neural networks of a given neural network.

13. The method of claim 10, wherein the first neural network and the second neural network are component neural networks of a given neural network.

* * * * *